(12) United States Patent
Seigler et al.

(10) Patent No.: US 7,573,684 B2
(45) Date of Patent: Aug. 11, 2009

(54) CURRENT-IN-PLANE DIFFERENTIAL MAGNETIC TRI-LAYER SENSOR

(75) Inventors: Michael Allen Seigler, Pittsburgh, PA (US); Hua Zhou, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 485 days.

(21) Appl. No.: 11/105,128

(22) Filed: Apr. 13, 2005

(65) Prior Publication Data

US 2006/0256485 A1 Nov. 16, 2006

(51) Int. Cl.
*G11B 5/33* (2006.01)
(52) U.S. Cl. ...................................... 360/322
(58) Field of Classification Search .................. None
See application file for complete search history.

(56) References Cited

U.S. PATENT DOCUMENTS

| | | | |
|---|---|---|---|
| 5,084,794 A | | 1/1992 | Smith |
| 5,287,238 A | * | 2/1994 | Baumgart et al. ............ 360/314 |
| 5,323,285 A | | 6/1994 | Smith |
| 5,442,508 A | | 8/1995 | Smith |
| 5,627,703 A | | 5/1997 | Smith |
| 5,644,456 A | | 7/1997 | Smith et al. |
| 5,701,222 A | * | 12/1997 | Gill et al. ...................... 360/314 |
| 5,751,521 A | * | 5/1998 | Gill .............................. 360/314 |
| 5,818,685 A | * | 10/1998 | Thayamballi et al. ........ 360/324 |
| 6,055,136 A | * | 4/2000 | Gill et al. ...................... 360/314 |
| 6,191,926 B1 | | 2/2001 | Everitt et al. |
| 6,256,176 B1 | | 7/2001 | Mao et al. |
| 6,556,388 B1 | | 4/2003 | Everitt et al. |
| 6,621,664 B1 | | 9/2003 | Trindade et al. |
| 6,667,862 B2 | | 12/2003 | Zhu |
| 7,019,371 B2 | * | 3/2006 | Seigler ......................... 257/425 |
| 2002/0044389 A1 | | 4/2002 | Seigler et al. |
| 2002/0044393 A1 | | 4/2002 | Seigler et al. |

FOREIGN PATENT DOCUMENTS

| | | |
|---|---|---|
| EP | 0576369 A2 | 12/1993 |
| EP | 0656620 A2 | 6/1995 |
| EP | 0656620 A3 | 1/1996 |
| EP | 0576369 A3 | 2/1996 |
| EP | 0663661 B1 | 6/1999 |
| EP | 0676746 B1 | 8/1999 |
| WO | WO 91/15012 | 10/1991 |

OTHER PUBLICATIONS

U.S. Appl. No. 10/764,720, filed Jan. 26, 2004, Seigler.

(Continued)

*Primary Examiner*—David D Davis
(74) *Attorney, Agent, or Firm*—Robert P. Lenart, Esq.; Pietragallo Gordon Alfano Bosick & Raspanti, LLP

(57) ABSTRACT

An apparatus comprises a first current-in-plane sensor, a first magnetic field source for biasing the first current-in-plane sensor in a first direction, a second current-in-plane sensor positioned parallel to the first current-in-plane sensor, a second magnetic field source for biasing the second current-in-plane sensor in a second direction, and first and second electrodes for supplying sense current to the first and second current-in-plane sensors.

19 Claims, 25 Drawing Sheets

OTHER PUBLICATIONS

N. Smith et al., "GMR Multilayers and Head Design for Ultrahigh Density Magnetic Recording," *IEEE Transactions on Magnetics*, vol. 32, No. 1, Jan. 1996, pp. 135-141.

N. Smith et al., "Analysis of a Dual Magnetoresistive Head," *IEEE Transactions on Magnetics*, vol. 28, No. 5, Sep. 1992, pp. 2295-2297.

N. Smith et al., "Dual Magnetoresistive Head For Very High Density Recording," *IEEE Transactions on Magnetics*, vol. 28, No. 5, Sep. 1992, pp. 2292-2294.

I. G. Trindade et al., "Narrow-Track Differential Head: Performance on Longitudinal and Perpendicular Disk Media," *IEEE Transactions on Magnetics*, vol. 38, No. 4, Jul. 2002, pp. 1814-1820.

* cited by examiner

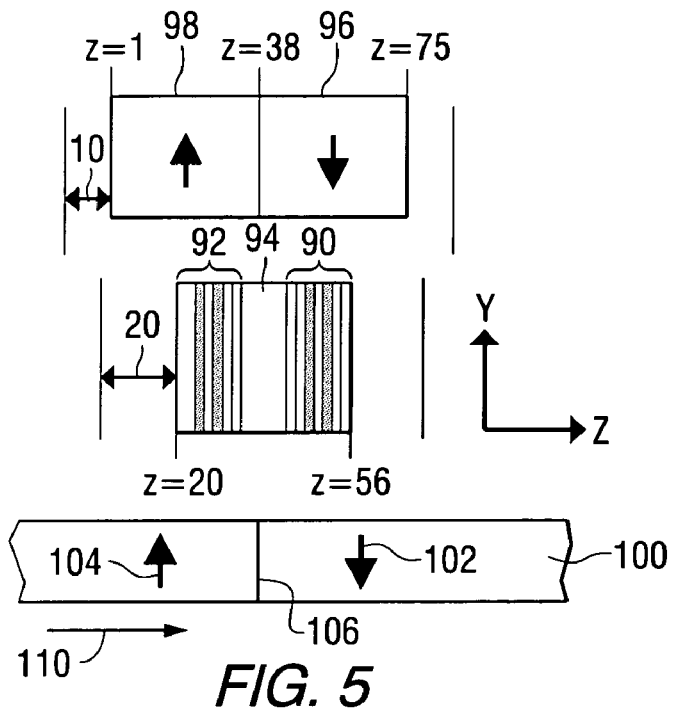
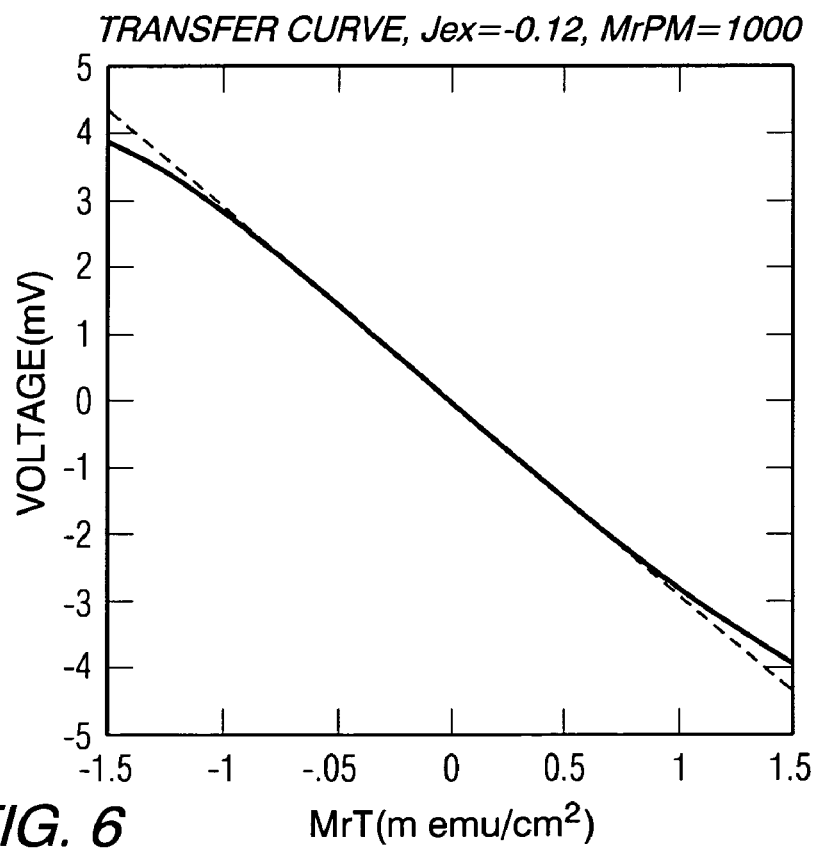
FIG. 6

CURRENT-IN-PLANE DIFFERENTIAL MAGNETIC TRI-LAYER SENSOR

FIELD OF THE INVENTION

This invention relates to magnetic sensors, and more particularly to current-in-plane (CIP) sensors.

BACKGROUND OF THE INVENTION

Devices utilizing the giant magneto-resistance (GMR) effect have utility as magnetic sensors, especially as read sensors in read heads used in magnetic disc storage systems. The GMR effect is observed in thin, electrically conductive multi-layer systems having multiple magnetic layers. One sensor type that utilizes the GMR effect is the GMR multi-layer. The GMR multi-layer typically comprises a series of bi-layer structures, each of which comprises a thin sheet of a ferromagnetic material and a thin sheet of a non-magnetic material. The bi-layers are stacked to form a multi-layer device. The multi-layer device is typically mounted in the read head so that the planes of the films are perpendicular to the surface of the disc. The magnetization of each ferromagnetic layer in the multi-layer device is approximately orthogonal to the magnetization of adjacent ferromagnetic layers and, when used in a magnetic disc storage system, would be oriented in a plane perpendicular to the plane of the disc.

In operation, a sense current flows through the read head and therefore through the sensor. Magnetic flux from the disc causes a rotation of the magnetization vector in at least one of the layers, which in turn causes a change in the overall resistance of the sensor. As the resistance of the sensor changes, the voltage across the sensor changes, thereby producing an output voltage.

The sense current can flow through the sensor in a direction that is parallel to the planes of the layers or stacked strips. This is known as a current-in-plane (CIP) configuration. The output voltage produced by the sensor is affected by various characteristics of the sensor.

One approach to reaching higher data storage areal densities is to use perpendicular magnetic storage media. As written bits in the media become smaller, readback sensors that are more sensitive are needed. A standard readback sensor gives a square wave output when reading from perpendicular media. This output contains a DC component that complicates the channel. One proposed solution is to differentiate the readback signal, but this leads to added noise. A second approach is to use a readback sensor that differentiates the flux from the media. This type of sensor would give a positive or negative voltage spike at a magnetic transition in the media. The orientation of the voltage spike would depend on the orientation of the transition (up-to-down magnetization or down-to-up magnetization).

There is a need for sensors that provide a high output in combination with flux differentiation.

SUMMARY OF THE INVENTION

This invention provides an apparatus comprising a first current-in-plane sensor, a first magnetic field source for biasing the first current-in-plane sensor in a first direction, a second current-in-plane sensor oriented in parallel with the first current-in-plane sensor, a second magnetic field source for biasing the second current-in-plane sensor in a second direction, and first and second electrodes for supplying sense current to the first and second current-in-plane sensors.

Each of the first and second current-in-plane sensors can comprise first and second layers of ferromagnetic material, and a layer of non-magnetic material positioned between the first and second layers of ferromagnetic material, wherein the thickness of the non-magnetic layer is selected to provide antiferromagnetic coupling between the first and second ferromagnetic layers.

BRIEF DESCRIPTION OF THE DRAWINGS

FIG. 5 is a schematic view of a sensor structure used to model operation of the invention.

FIGS. 6 through 10 are graphs of data calculated based on the model of FIG. 5.

DETAILED DESCRIPTION OF THE INVENTION

This invention provides a differential sensor formed from current-in-plane tri-layer (CIP3L) sensors. This combines the high output of the CIP3L sensor and the flux differentiation of a differential sensor. The current-in-plane sensor can include nano-oxide layers (NOLs) and a thin non-magnetic spacer layer.

Figure 1:
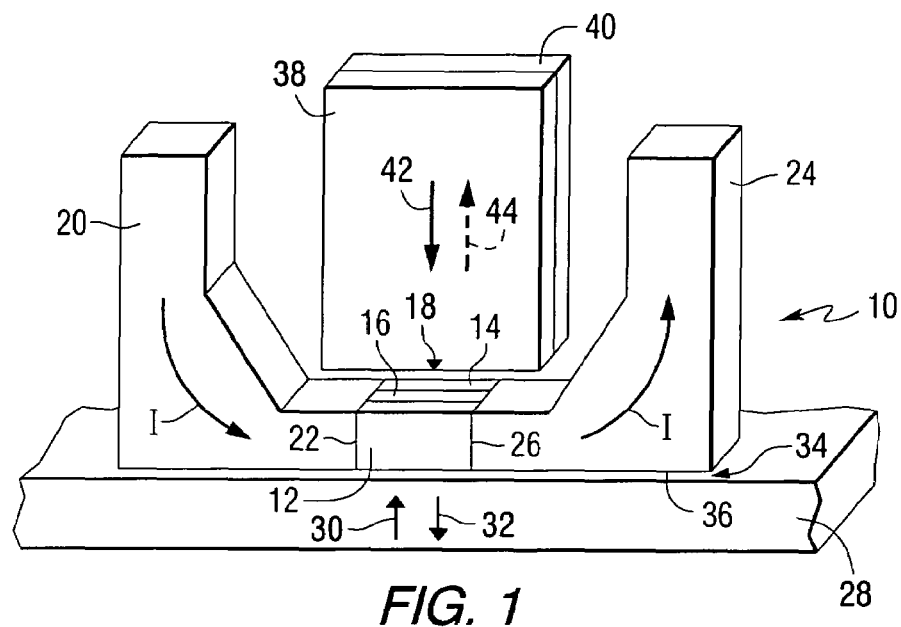
FIG. 1 is an isometric view of a sensor constructed in accordance with the invention.

FIG. 1 is an isometric view of a dual CIP sensor 10 constructed in accordance with this invention. The sensor includes two current-in-plane sensing elements 12 and 14, which can be tri-layer (CIP3L) CIP sensing elements that are magnetically biased in opposite directions and are separated by a spacer layer 16. The spacer layer can be an electrically insulating material, a material having a high electrical resistivity, or a semiconductor material. The combination of sensing elements 12 and 14 and insulating layer 16 is referred to as a sensing element stack 18. A first electrical contact, or lead, 20 is electrically connected to a first end 22 of each of the sensing elements. A second electrical contact, or lead, 24 is electrically connected to a second end 26 of each of the sensing elements. The sensor is positioned adjacent to a magnetic storage medium 28 having a plurality of areas of magnetization, also called domains, 30 and 32 representative of bits of information. The magnetization of these areas is oriented in one of two directions that are perpendicular to the plane of the storage medium. The sensor is separated from the storage medium by an air bearing 34. The bottom surface 36 of the sensor is referred to as the air bearing surface. Bias magnets 38 and 40, which can be permanent magnets, are positioned adjacent to the sensing elements near a side opposite the air bearing surface, to bias the direction of magnetization of the magnetic layers of the sensing elements. Magnet 38 has a direction of magnetization indicated by arrow 42, and magnet 40 has a direction of magnetization indicated by arrow 44. Thus the bias magnets have opposite (antiparallel)

directions of magnetization. Magnet 38 is used to bias sensing element 12 and magnet 40 is used to bias sensing element 14.

The sensor of FIG. 1 is a differential reader. In operation, a sense current I is conducted from contact 20, through the sensing elements 12 and 14, which are electrically connected in parallel, and through contact 24. Magnetic fields produced by magnetic domains in the disc can affect the direction of magnetization of the ferromagnetic layers in the sensor, thereby changing the resistance of the sensor. This change in resistance causes a change in voltage across the sensor when a current I is passed through the sensor. This voltage can be used as an indication of a change in the magnetization of the domains in the disc. A change in the magnetization will create a positive or negative spike in the voltage. The sensor voltage can be measured during time periods referred to as clock windows. If there is no voltage spike in a given clock window, it is assumed that the magnetization in the media did not change. If there is a voltage spike, we know the magnetization changed and in what direction. The layers of the sensor stack are in-planes that lie substantially perpendicular to the air bearing surface and the current passes through the sensor in a direction parallel to the planes of the layers. In the example of FIG. 1, the media would be rotating into the paper. The bits illustrated by arrows 30 and 32 of FIG. 1 represent bits in adjacent tracks in the media. As the media rotates, adjacent bits in a given track create the change in magnetization, and thus a spike in the voltage across the sensor.

Figure 2:
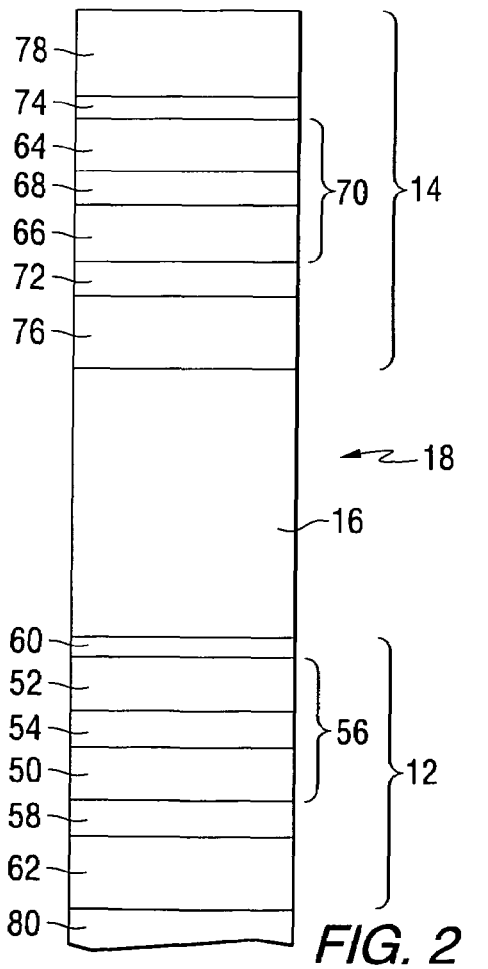
FIG. 2 is an end view of a sensor stack constructed in accordance with the invention.

FIG. 2 is a cross-sectional view of the sensing element stack 18 of the sensor of FIG. 1. Sensing element 12 includes a first ferromagnetic layer 50 and a second ferromagnetic layer 52, positioned on opposite sides of a non-magnetic layer 54 to form a tri-layer stack 56. The thickness of the non-magnetic layer is selected to produce antiferromagnetic coupling between the first and second ferromagnetic layers. A first nano-oxide layer 58 is positioned adjacent to layer 50 and a second nano-oxide layer 60 is positioned adjacent to layer 52. A seed layer 62 is positioned adjacent to the first nano-oxide layer 58.

Sensing element 14 includes a first ferromagnetic layer 64 and a second ferromagnetic layer 66, positioned on opposite sides of a non-magnetic layer 68 to form a tri-layer stack 70. The thickness of the non-magnetic layer is selected to produce antiferromagnetic coupling between the first and second ferromagnetic layers. A first nano-oxide layer 72 is positioned adjacent to layer 66 and a second nano-oxide layer 74 is positioned adjacent to layer 64. A seed layer 76 is positioned adjacent to the first nano-oxide layer 72. A cap layer 78 is positioned adjacent to the second nano-oxide layer 74. When fabricating the stack, the seed layer 62 can be formed on a wafer or substrate 80.

Figure 3:
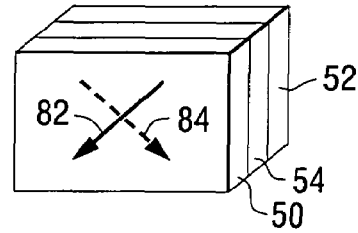
FIGS. 3 and 4 are isometric views of tri-layer structures.

In the sensor of FIG. 1, magnet 38 is positioned adjacent to one side of sensing element 12 (opposite the air bearing side of the sensing element) to bias the magnetization of the first and second layers 50, 52 of ferromagnetic material in directions approximately 90° with respect to each other. FIG. 3 shows the tri-layer stack portion of sensing element 12. Arrow 82 illustrates the direction of magnetization in layer 50 and arrow 84 illustrates the direction of magnetization in layer 52. The directions of magnetization of the first and second layers of ferromagnetic material are approximately 90° with respect to each other.

Figure 4:
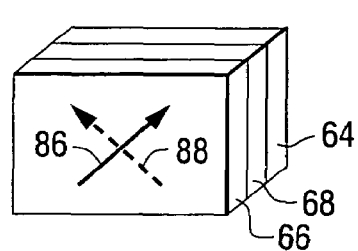

In the sensor of FIG. 1, magnet 40 is positioned adjacent to one side of sensing element 14 (opposite the air bearing side of the sensing element) to bias the magnetization of the first and second layers 64, 66 of ferromagnetic material in directions approximately 90° with respect to each other. FIG. 4 shows the tri-layer stack portion of sensing element 14. Arrow 86 illustrates the direction of magnetization in layer 64 and arrow 88 illustrates the direction of magnetization in layer 66. The directions of magnetization of the first and second layers of ferromagnetic material are approximately 90° with respect to each other.

For good biasing, the directions of magnetization in the two layers should be approximately 90 degrees apart, but the angle between the directions of magnetization does not have to be exact (and there is no way to control the angle exactly). The current flowing through the non-magnetic layer separating the two ferromagnetic layers creates a magnetic field that acts on the two ferromagnetic layers differently. This causes one of the layers to point more vertically (perpendicular to the ABS) and the other layer to point more horizontally (parallel to the ABS). The layers are still ~90 degrees apart. The field from the current is circular around the non-magnetic layer, so it is pointing up on one ferromagnetic layer and down on the other. Thus, one layer sees a downward field from the biasing PM added to the downward field from the current, and the other layer sees the downward field from the biasing PM and the upward field from the current subtracted from this downward field.

In one example, the layer of non-magnetic material in the tri-layer structure has a thickness in the range of 5 to 13 Å. The non-magnetic layer can comprise a material selected from Cu, Ag, Au, Cr or their alloys. The first and second ferromagnetic layers can comprise a material selected from the group of CoFe, NiFe, Fe, Co and Ni, and alloys thereof. The first and second layers of ferromagnetic material can each have a thickness in the range of 10 to 20 Å. Antiferromagnetic coupling between the first and second ferromagnetic layers can comprise RKKY coupling, magnetostatic coupling, or a combination of RKKY coupling and magnetostatic coupling. The spacer layer 16 can comprise, for example, aluminum oxide.

FIG. 5 shows a sensor configuration that was used as a model for simulation purposes. In FIG. 5, there are 15 layers in the sensor stack. The materials and corresponding thicknesses of the layers in each of the tri-layer sensors 90 and 92 are NiFeCr 2, CoFeO 1, CoFe 1.5, Cu 1, CoFe 1.5, FeCoO 0.5, and AlO 3 (wherein all dimensions are in nm). The thickness of the center insulator 94 (AlO) is 15 nm. Thus the total thickness of the differential reader is 36 nm. Permanent magnets 96 and 98, having antiparallel magnetizations, are positioned above the sensor stack. Media 100 includes magnetic domains 102 and 104 and a transition region 106 between the domains. Arrow 110 shows the direction of the media. The "z" parameter represents distance in nanometers. This embodiment has been modeled to calculate expected performance parameters. The initial values of the model parameters are listed in Table 1. The transition width is the media transition parameter in Table 1.

TABLE 1

Model Parameters

| Parameter | Initial Value | Parameter | Initial Value |
|---|---|---|---|
| Stripe Width | 40 nm | Stripe Height | 40 nm |
| Sensor shield spacing | 20 nm | PM shield spacing | 10 nm |
| Head-to-Media Separation | 10 nm | Media Magnetization | 800 emu/cc |
| Media Track Width | 70 nm | Media Thickness | 10 nm |
| Head-to-SUL spacing | 32 nm | SUL Permeability | 400 |
| Media transition parameter | 5 nm | PM sensor separation | 5 nm |

TABLE 1-continued

Model Parameters

| Parameter | Initial Value | Parameter | Initial Value |
|---|---|---|---|
| PM width | 440 nm | PM height | 500 nm |
| PM thickness | 37 nm | | |

Figure 7:
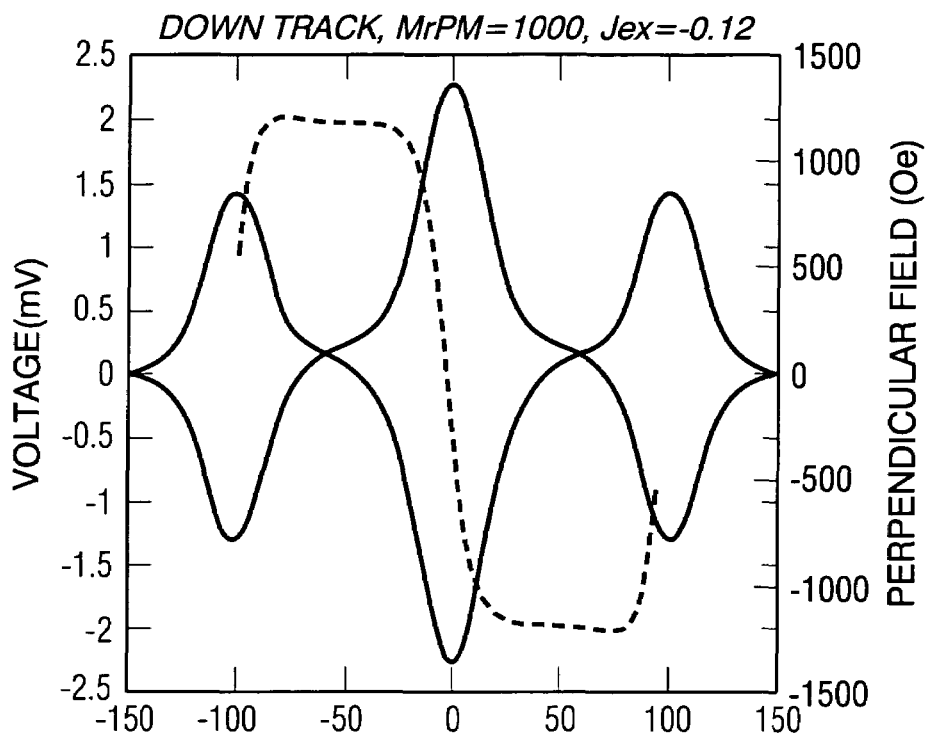
Figure 8:
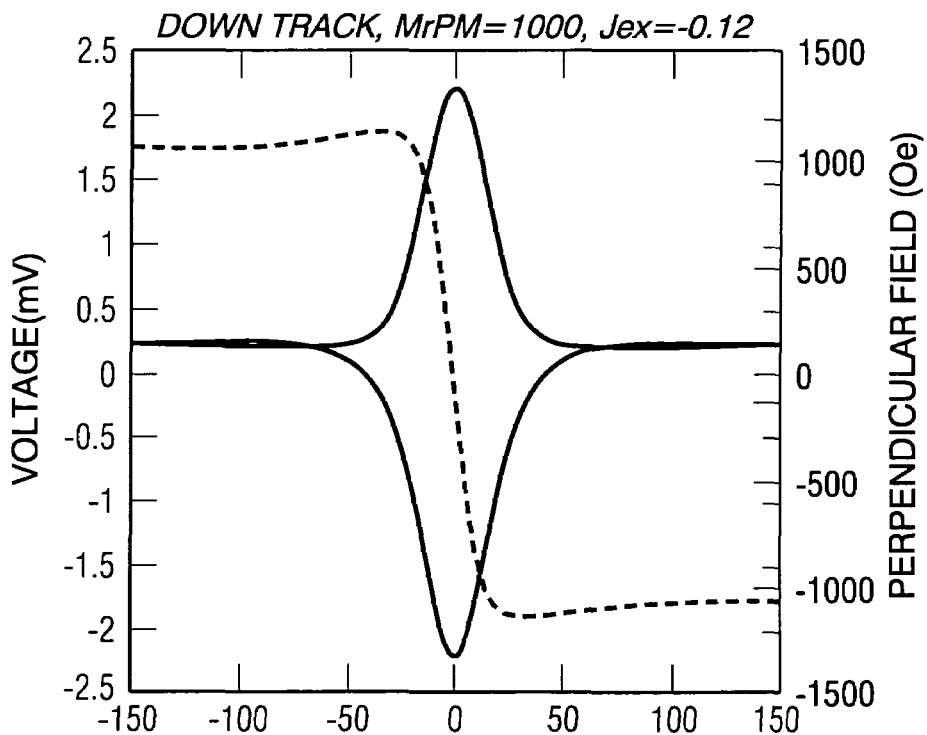

FIGS. 6 and 7 show a calculated transfer curve and the corresponding on-track response for the initial reader design shown in FIG. 5. Note that the transfer curve is calculated with the reader center sitting on top of the transition. The exchange coupling parameter is $J_{ex}=-0.12$ erg/cm$^2$. The permanent magnet remnant magnetization is MrPM=1000 emu/cm$^3$. The transfer curve shows good linearity over a large range of media MrT. Also, the curve is almost perfectly symmetric. In the down track response plot, the perpendicular field from media (broken curve) is overlapped with the readback voltage. The graph shows the readback voltage for both polarities of the media field. That is, it shows the readback for an up-to-down bit transition and the readback for a down-to-up bit transition. The data shows good agreement between the peaks of the reader response and the transition of the media field. Note that the field transition at the ends is caused by media cut-off in the model, which is 100 nm from the transition. FIG. 8 shows the corresponding results when media cut-off position (media patch length) is increased to 250 nm.

The pulse width at 50% (PW50) is defined as the maximum half width of the two peaks (corresponding to the reader response of a forward scan of the transition and a backward scan with media magnetization reversed) using the 0-field response as a reference point. There are several things to consider when defining PW50, including which peak(s) to use, and whether to use a 0-field or a uniform field as the reference point for peak amplitude. The worst-case scenario has been assumed by choosing the maximum half width of the two peaks. The 0-field was chosen rather than a uniform field as the reference since in some cases the reader response to a uniform field is not well defined, as shown below.

Figure 9:
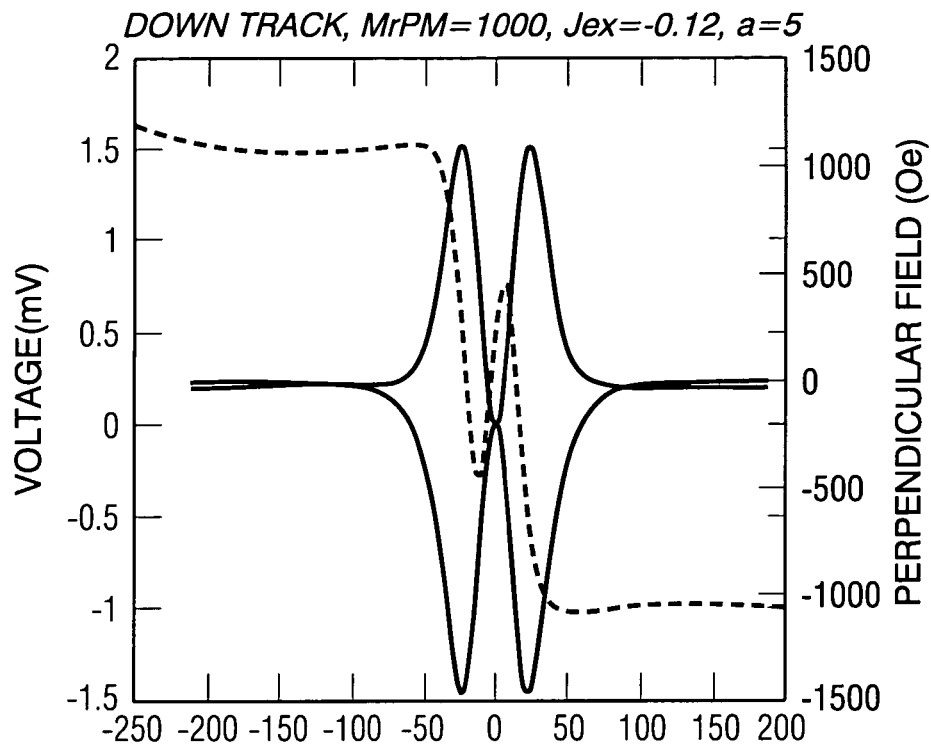

The down track curve in FIG. 8 has a PW50 of 37.5 nm. The down track response curve of the same reader to three transitions (with a bit length of 17.5 nm) is shown in FIG. 9, which shows a significant roll-off effect. It is desirable to optimize the differential reader so that smallest PW50 and least roll-off effects are obtained, for example by changing the thickness of the spacer layer between the two current-in-plane sensors.

Figure 10:
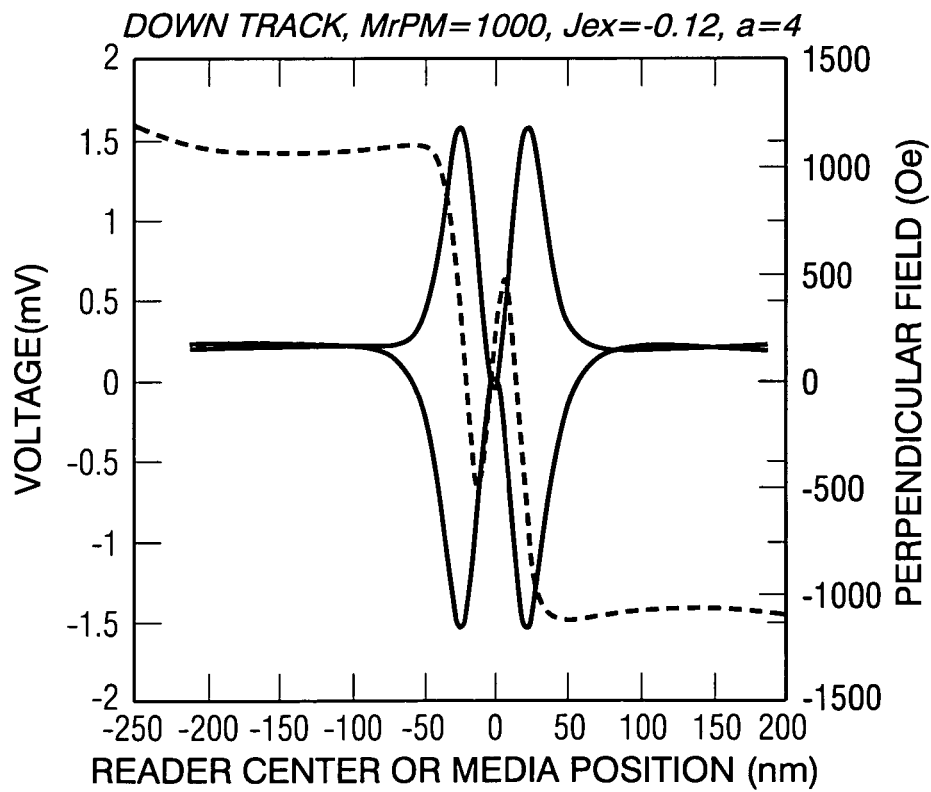

First, a quick check was done to make sure that the roll-off is not caused by a relatively large media transition parameter (a-parameter) used. The shape of the magnetization transition in the model is an arctangent. In particular, the transition parameter is defined by the following formula:

$$M(z) = \frac{2M_r}{\pi} \tan^{-1} \frac{z - z_0}{a}$$

where a is the transition parameter, $M_r$ is the media magnetization, and $z_0$ is the transition center. The results are shown in FIG. 10. Decreasing the a-parameter from 5 nm to 4 nm does not have much effect on the roll-off effect. The results presented below are with a=4 nm.

Figure 11:
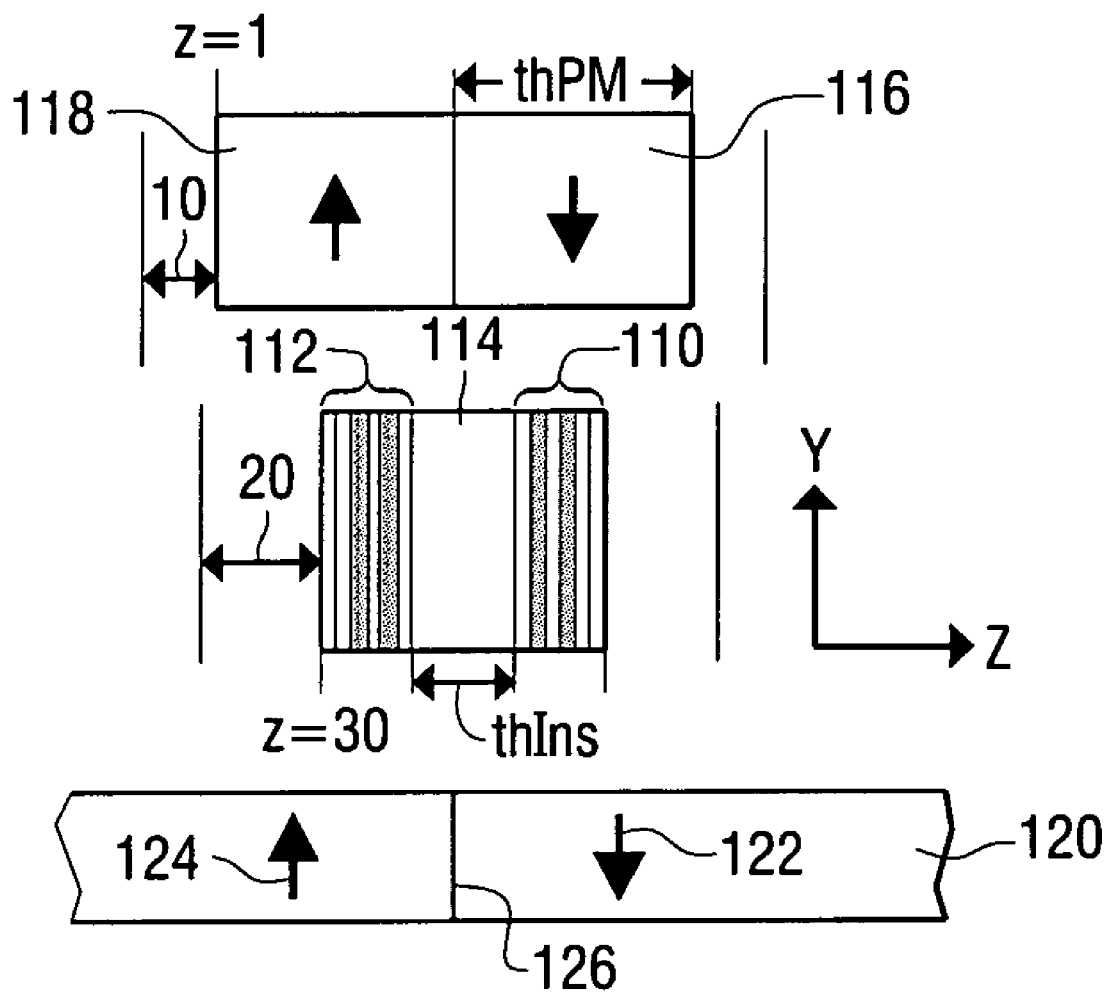
FIG. 11 is a schematic view of another sensor structure used to model operation of the invention.
Figure 12A:
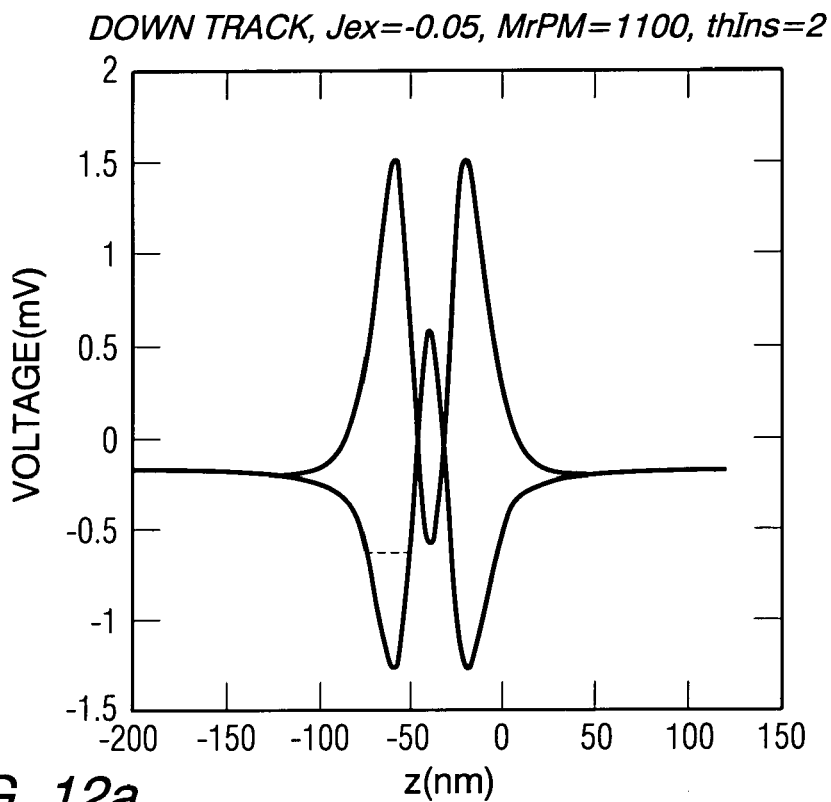
FIGS. 12 through 16 are graphs of data calculated based on the model of FIG. 11.
Figure 12B:
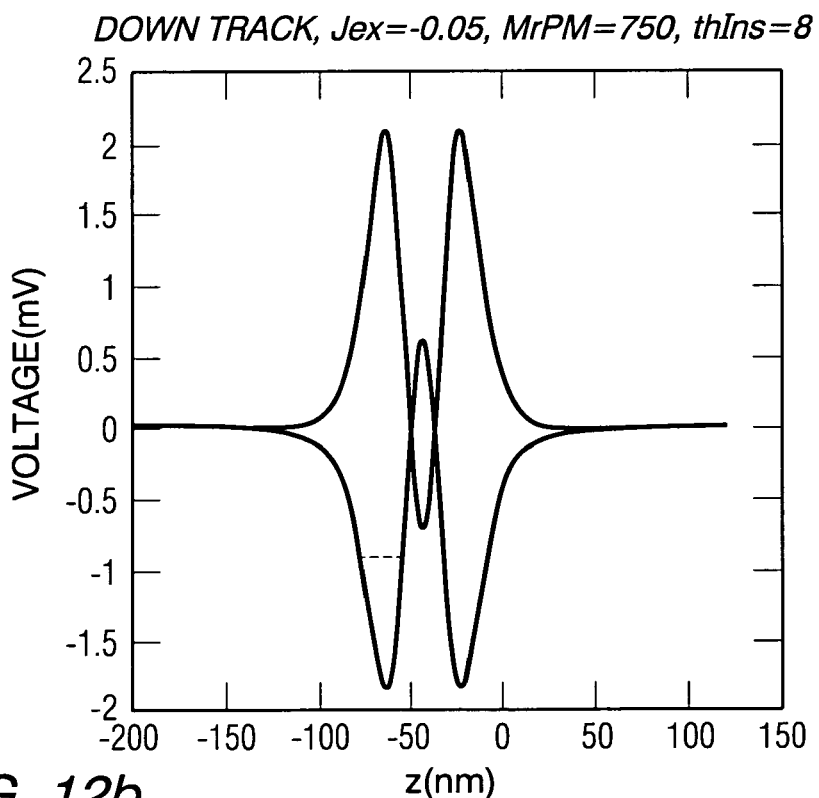
Figure 12C:
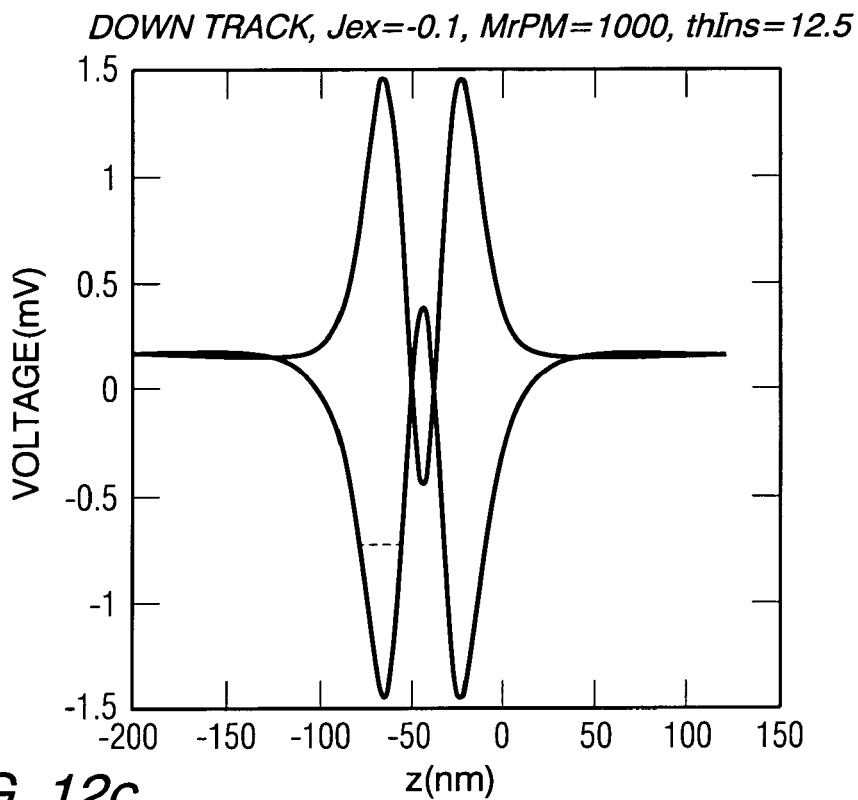
Figure 12D:
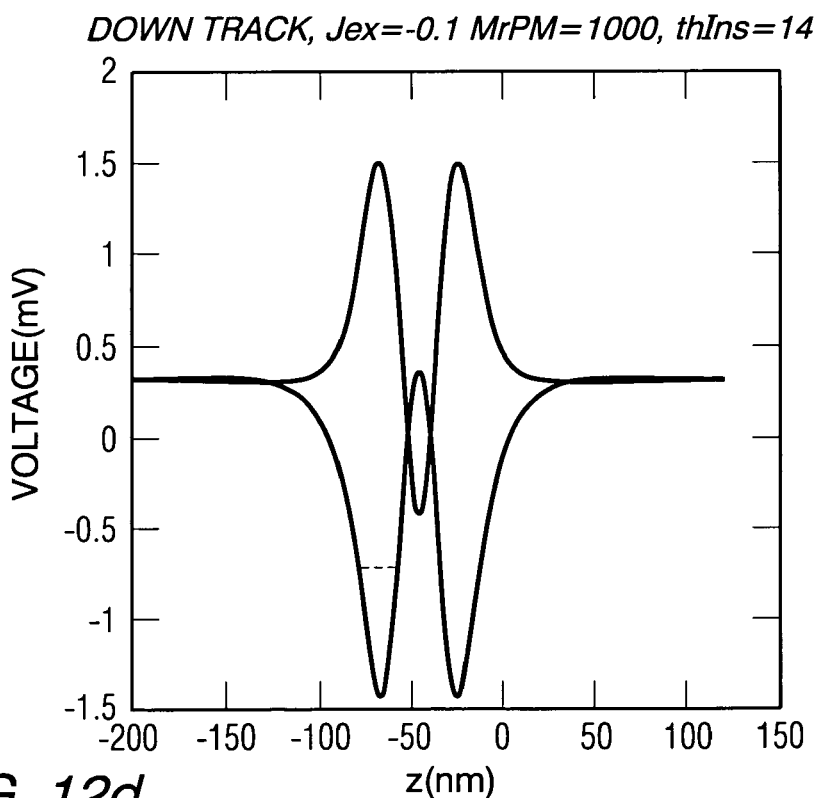
Figure 12E:
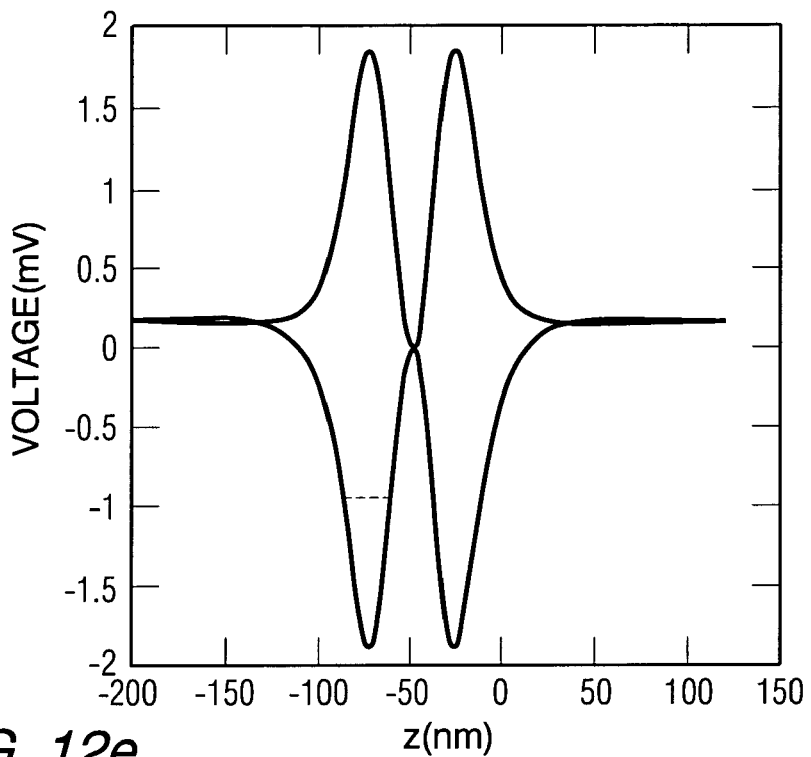
Figure 12F:
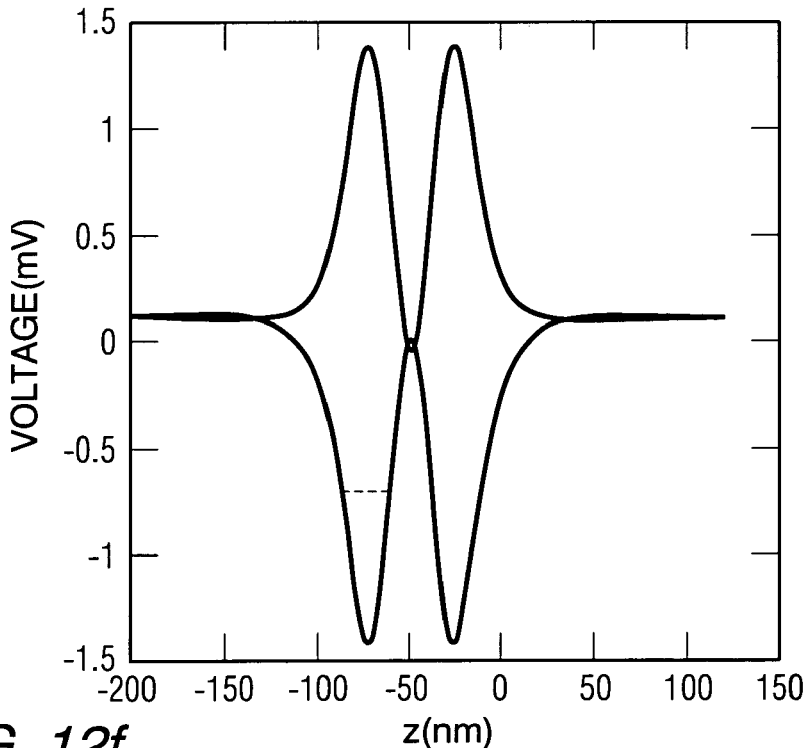
Figure 13A:
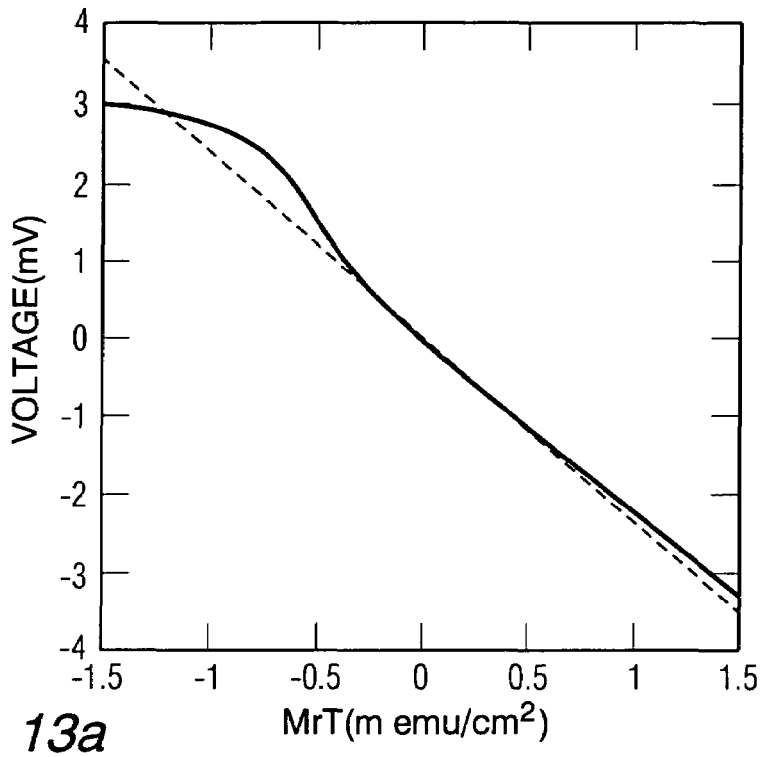
Figure 13B:
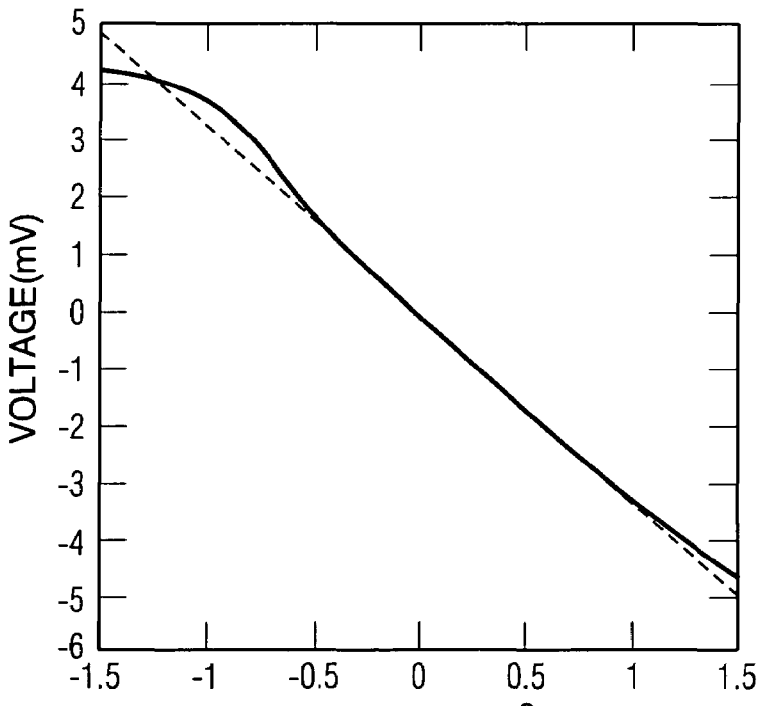
Figure 13C:
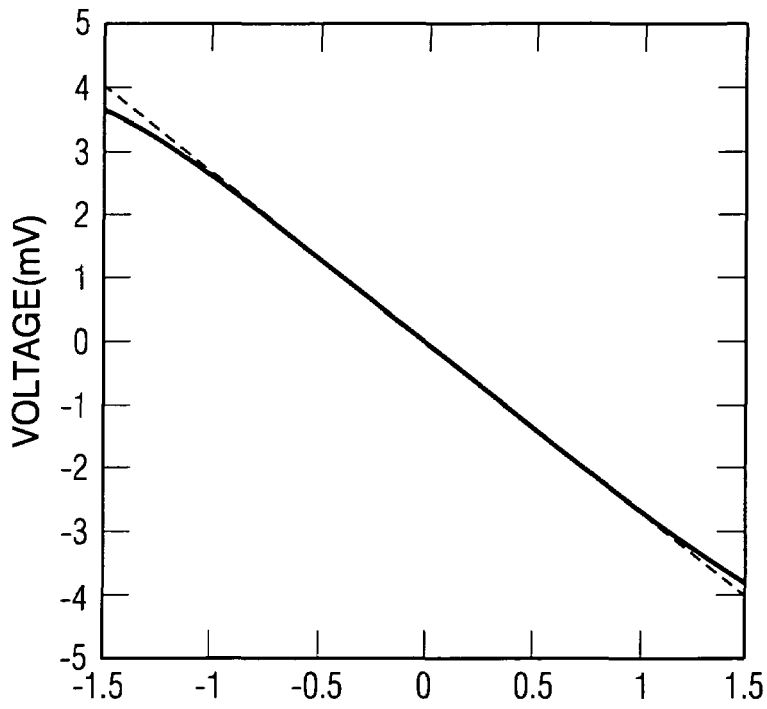
Figure 13D:
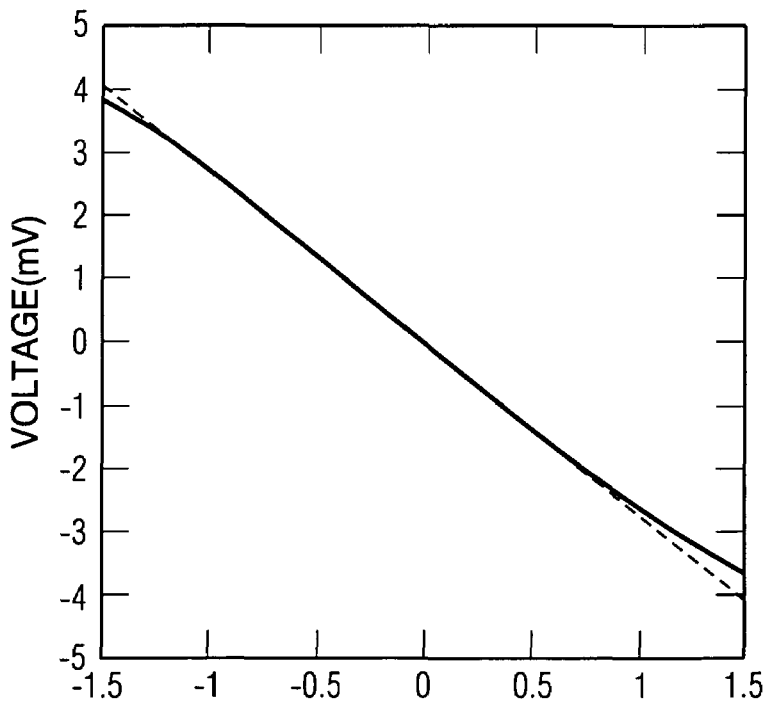
Figure 13E:
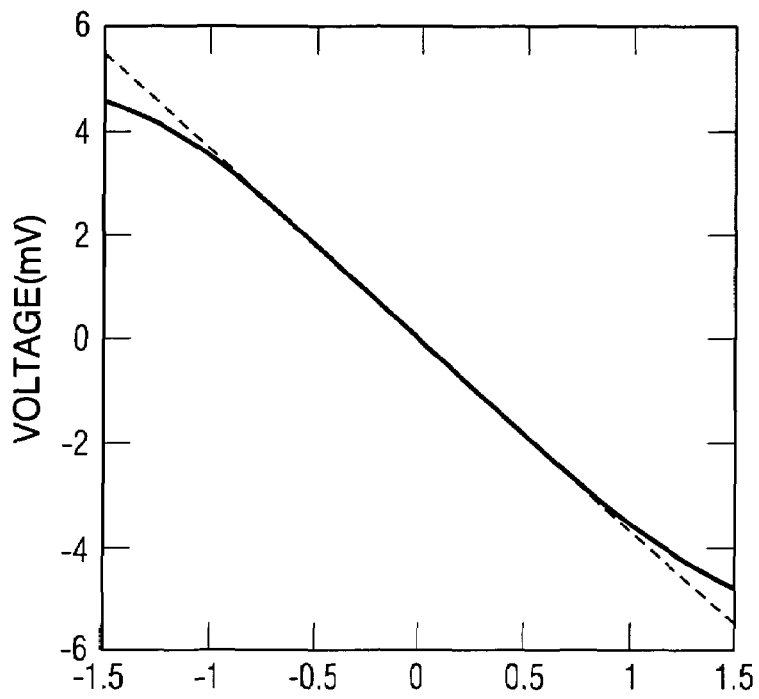
Figure 13F:
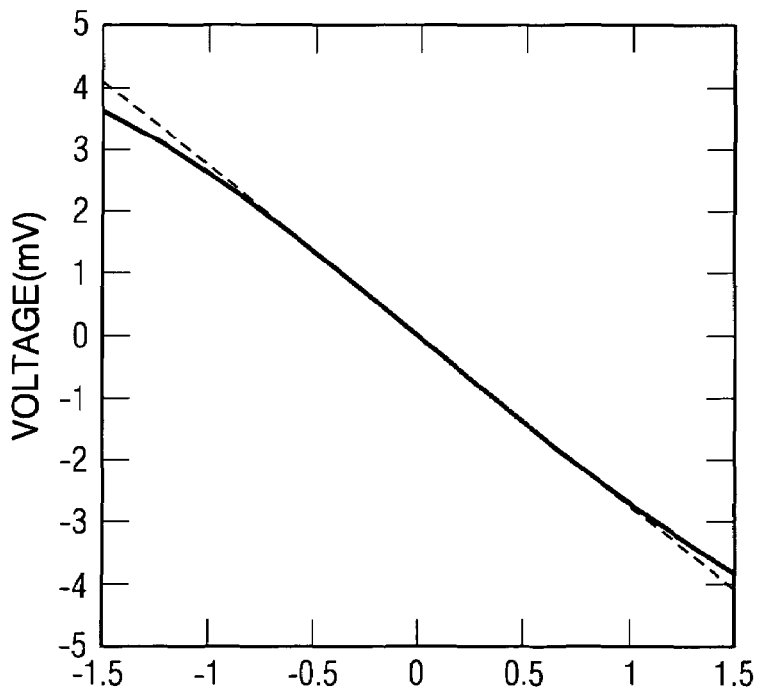

The effect of varying the thickness of the insulator between the two CIP3L sensors has also been modeled. FIG. 11 is a schematic representation of the geometry used for this modeling. FIG. 11 shows that the position of permanent magnet (PM) bottoms (left side of PM 118 in FIG. 11) and the position of the sensor bottoms are fixed. Thus when the insulator thicknesses decrease, the PM thickness also decreases to keep the PMs and the sensor properly aligned.

As the thickness of insulator is changed, and thus the thickness of the PMs, $J_{ex}$ and/or MrPM is adjusted so that the sensor is always properly biased (asymmetry is used as the metric to determine proper biasing). It turns out, when using the design of FIG. 5, that for small insulator thicknesses, the PM thickness becomes so small that it is very difficult to get appropriate biasing for reasonable values of $J_{ex}$ and MrPM. Thus the design was modified such that the offset between the PM bottom and sensor bottom is increased from 19 nm to 29 nm, as shown in FIG. 11. This results in 10 nm thicker PMs for the same insulator thickness. Note that in FIG. 11 the three inner most layers of insulator (of FIG. 5) have been combined.

Table 2 shows a sample transfer curve parametric study for various insulator thicknesses (thIns) for the reader design of FIG. 11. In Table 2, as in other transfer curve studies, Vpp is the peak-to-peak voltage, MrT1 and MrT2 are the ends of the linear region where the deviation of the transfer curve from linear is less than 10% of Vpp. V1 and V2 are the corresponding voltage at MrT1 and MrT2. Sensitivity is the slope of the line that fits the middle part of the curve. Asymmetry is defined as $(V1-V(0))/(V(0)-V2)$, where V(0) is the voltage at MrT=0, (V(0) is 0 by definition of signal voltage. Hysteresis is the area of the hysteresis loop.

TABLE 2

Effect of $J_{ex}$, MrPM and thIns (See FIG. 4) on Transfer curve. The PM thickness thPM) varies with thIns. For thIns = 21 nm, thPM = 47 nm.

| Jex erg/cm$^2$ | MrPM emu/cm$^3$ | thIns nm | Vpp mV | MrT1 memu/cm$^2$ | MrT2 memu/cm$^2$ | V1 mV | V2 mV | Sensitivity mVcm$^2$/memu | Asymmetry 1 | Hysteresis mVmemu/cm$^2$ |
|---|---|---|---|---|---|---|---|---|---|---|
| −0.15 | 500 | 2 | 0.236 | 0.57 | 1.41 | −0.035 | −0.196 | −0.193 | −0.180 | 0.000 |
| −0.15 | 750 | 2 | 0.166 | 0.30 | 1.50 | 0.046 | −0.100 | −0.122 | −0.099 | −0.122 |
| −0.15 | 1000 | 2 | 0.223 | 0.30 | 1.50 | 0.246 | 0.050 | −0.163 | −0.098 | −0.126 |
| −0.1 | 500 | 2 | 0.294 | 0.24 | 1.47 | −0.033 | −0.265 | −0.190 | −0.126 | −0.030 |
| −0.1 | 750 | 2 | 2.056 | 0.60 | 0.99 | −0.829 | −1.401 | −2.225 | −0.592 | 0.034 |
| −0.1 | 1000 | 2 | 2.778 | −0.84 | 1.50 | 0.770 | −1.905 | −1.327 | 0.407 | 0.002 |
| −0.05 | 500 | 2 | 3.501 | 0.69 | 0.99 | −1.632 | −2.429 | −4.817 | −0.672 | 0.717 |
| −0.05 | 750 | 2 | 4.930 | 0.06 | 1.20 | −1.209 | −4.008 | −2.813 | −0.302 | 0.164 |
| −0.05 | 1000 | 2 | 6.227 | −1.50 | 1.50 | 2.995 | −3.232 | −2.332 | 0.928 | 0.005 |
| −0.15 | 500 | 8 | 2.091 | 0.78 | 0.72 | −0.963 | −0.400 | −2.515 | −2.407 | 0.015 |
| −0.15 | 750 | 8 | 3.136 | −0.75 | 1.50 | 0.685 | −2.338 | −1.492 | 0.293 | 0.002 |
| −0.15 | 1000 | 8 | 4.001 | −1.32 | 1.50 | 1.537 | −2.378 | −1.465 | 0.647 | 0.001 |

TABLE 2-continued

Effect of $J_{ex}$, MrPM and thIns (See FIG. 4) on Transfer curve. The PM thickness thPM) varies with thIns. For thIns = 21 nm, thPM = 47 nm.

| Jex erg/cm^2 | MrPM emu/cm^3 | thIns nm | Vpp mV | MrT1 memu/cm^2 | MrT2 memu/cm^2 | V1 mV | V2 mV | Sensitivity mVcm^2/memu | Asymmetry 1 | Hysteresis mVmemu/cm^2 |
|---|---|---|---|---|---|---|---|---|---|---|
| −0.1 | 500 | 8 | 3.699 | 0.45 | 1.41 | −1.253 | −3.352 | −2.649 | −0.373 | 0.026 |
| −0.1 | 750 | 8 | 5.327 | −1.14 | 1.50 | 1.929 | −3.322 | −2.144 | 0.582 | 0.002 |
| −0.1 | 1000 | 8 | 6.283 | −1.50 | 1.50 | 2.784 | −3.498 | −2.193 | 0.796 | 0.001 |
| −0.05 | 500 | 8 | 6.878 | 0.03 | 1.50 | −1.577 | −6.442 | −3.263 | −0.245 | 0.147 |
| −0.05 | 750 | 8 | 8.868 | −1.50 | 1.50 | 4.269 | −4.600 | −3.279 | 0.930 | 0.004 |
| −0.05 | 1000 | 8 | 7.658 | −1.50 | 1.38 | 4.418 | −3.053 | −2.764 | 1.447 | 0.002 |
| −0.15 | 500 | 14 | 3.796 | 0.27 | 1.5 | −0.475 | −3.473 | −2.192 | −0.137 | 0.003 |
| −0.15 | 750 | 14 | 5.483 | −1.11 | 1.5 | 1.836 | −3.481 | −2.137 | 0.528 | 0.001 |
| −0.15 | 1000 | 14 | 6.428 | −1.41 | 1.5 | 2.597 | −3.736 | −2.292 | 0.695 | 0 |
| −0.1 | 500 | 14 | 6.133 | −0.03 | 1.5 | 0.317 | −4.816 | −2.899 | 0.07 | 0.005 |
| −0.1 | 750 | 14 | 8.162 | −1.32 | 1.5 | 3.237 | −4.784 | −3.036 | 0.677 | 0.002 |
| −0.1 | 1000 | 14 | 7.478 | −1.5 | 1.5 | 3.84 | −3.638 | −2.718 | 1.053 | 0.001 |
| −0.05 | 500 | 14 | 9.718 | −0.36 | 1.5 | 2.184 | −6.06 | −4.245 | 0.361 | 0.007 |
| −0.05 | 750 | 14 | 9.534 | −1.5 | 1.11 | 5.521 | −3.303 | −3.819 | 1.671 | 0.003 |
| −0.05 | 1000 | 14 | 6.883 | −1.5 | 1.2 | 4.152 | −2.312 | −2.498 | 1.793 | 0.001 |
| −0.15 | 500 | 21 | 5.773 | −0.69 | 1.50 | 1.252 | −4.428 | −2.716 | 0.283 | 0.002 |
| −0.15 | 750 | 21 | 7.841 | −1.20 | 1.50 | 2.748 | −4.813 | −2.943 | 0.571 | 0.001 |
| −0.15 | 1000 | 21 | 7.443 | −1.50 | 1.50 | 3.609 | −3.834 | −2.727 | 0.940 | 0.001 |
| −0.1 | 500 | 21 | 8.629 | −0.90 | 1.50 | 2.652 | −5.897 | −3.778 | 0.450 | 0.002 |
| −0.1 | 750 | 21 | 9.378 | −1.50 | 1.50 | 4.599 | −4.779 | −3.684 | 0.961 | 0.002 |
| −0.1 | 1000 | 21 | 7.122 | −1.50 | 1.41 | 4.033 | −2.959 | −2.601 | 1.361 | 0.001 |
| −0.05 | 500 | 21 | 11.201 | −1.20 | 1.32 | 5.111 | −5.662 | −5.103 | 0.905 | 0.007 |
| −0.05 | 750 | 21 | 8.827 | −1.50 | 0.72 | 5.891 | −1.905 | −3.766 | 3.095 | 0.003 |
| −0.05 | 1000 | 21 | 5.939 | −1.50 | 0.99 | 3.851 | −1.850 | −2.426 | 2.078 | 0.001 |

The data in Table 2 provide an indication of which situations provide a symmetric transfer curve (asymmetry~1). By doing refinement runs on $J_{ex}$ and/or MrPM exact sets of $J_{ex}$ and MrPM can be found for each insulator thickness which make the asymmetry~1.

FIGS. 12a through 12f show the down track responses of the differential reader for an appropriate set of $J_{ex}$ and MrPMs such that good transfer curves are obtained. FIGS. 13a through 13f show the corresponding transfer curves. FIGS. 12a through 12f show that higher peaks are obtained for the second transition (in which roll-off is manifested) when the insulator thickness (thIns) is decreased from 21 nm to smaller values.

Table 3 shows PW50 of the response of the differential reader, with various thins, to a single transition. An insulator thickness of thIns=12.5 nm gives the smallest PW50 of 30.27 nm. Note that this insulator thickness corresponds to a distance of 17.5 nm between the centers of the CIP3L sensors, exactly the same as the targeted bit length. A bit length of 17.5 nm and a track width of 70 nm translate to an areal density of ~500 Gbit/in². This gives a PW50/bit length ratio of 1.73, which is very good.

TABLE 3

PW50 and Vpp for various insulator thickness and suitable Jex and MrPM so that the sensor is properly biased. The results are for 1 bit.

| Jex erg/cm² | MrPM emu/cm³ | thIns nm | Vpp mV | PW50 nm |
|---|---|---|---|---|
| −0.05 | 1100 | 2 | 3.84 | 32.42 |
| −0.05 | 750 | 8 | 5.56 | 30.84 |
| −0.1 | 1000 | 12.5 | 4.17 | 30.27 |
| −0.1 | 1000 | 14 | 4.20 | 32.04 |
| −0.1 | 750 | 21 | 5.67 | 35.88 |
| −0.15 | 1000 | 21 | 4.20 | 36.11 |

Figure 14A:
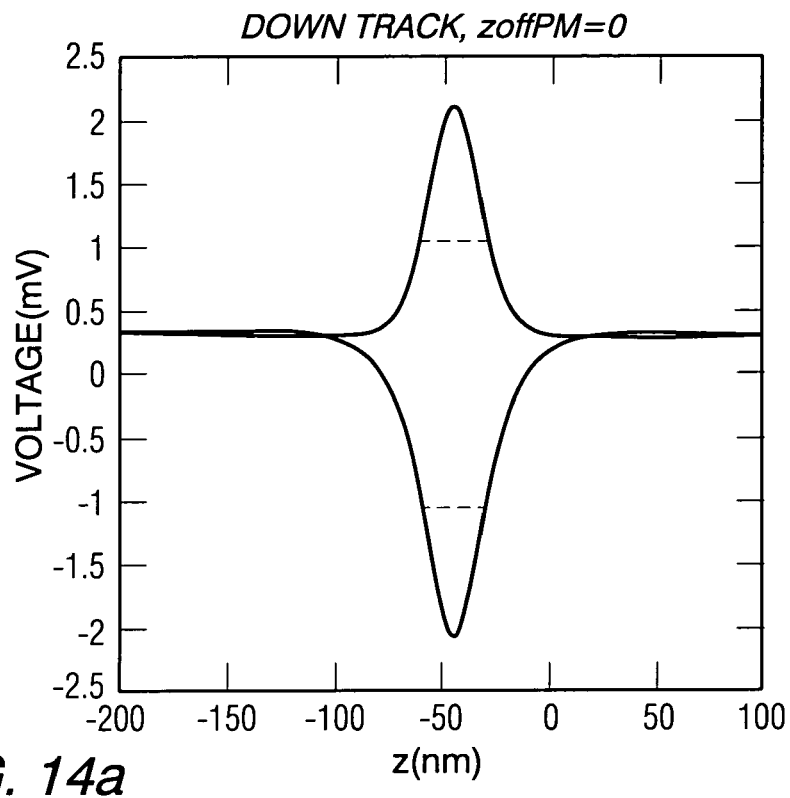
Figure 14B:
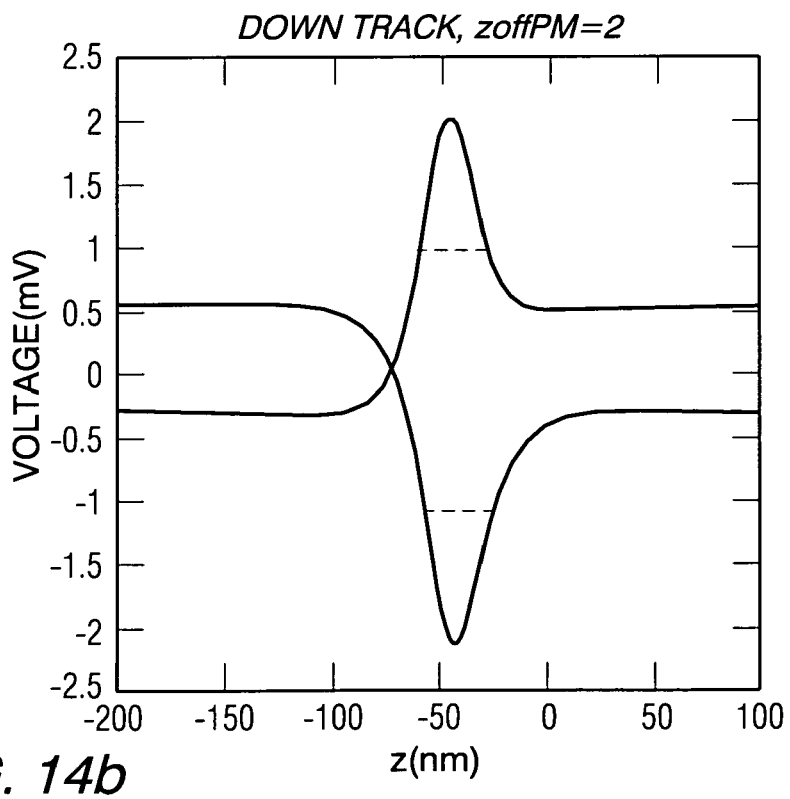
Figure 14C:
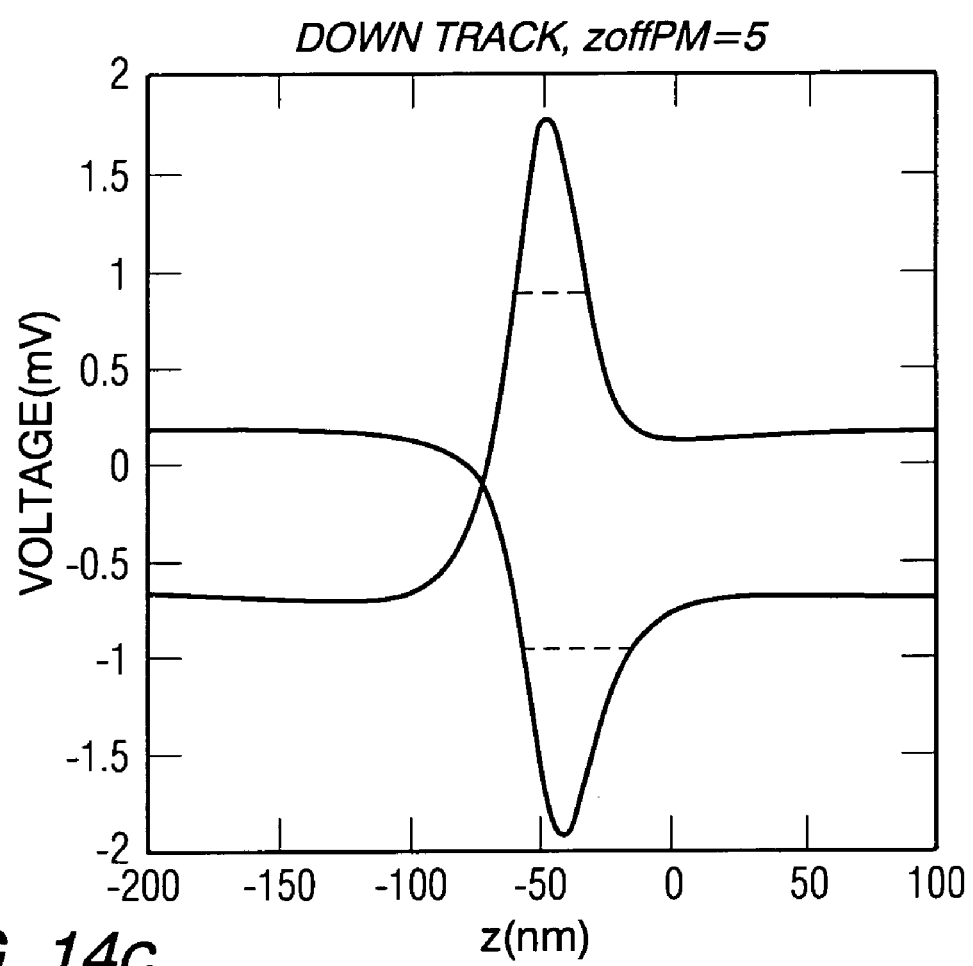
Figure 14D:
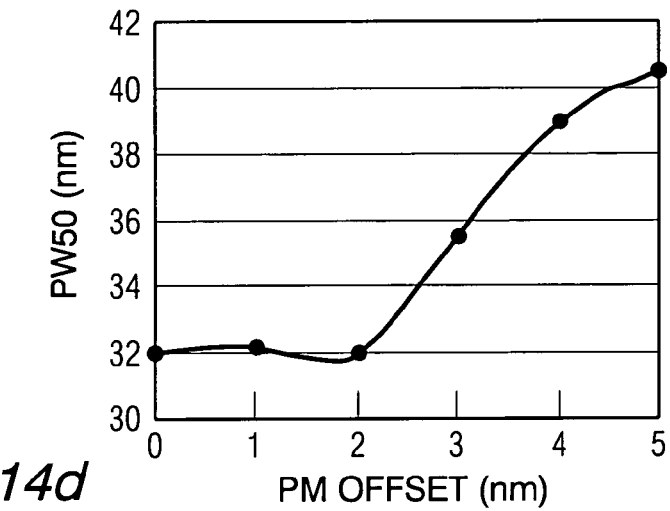
Figure 14E:
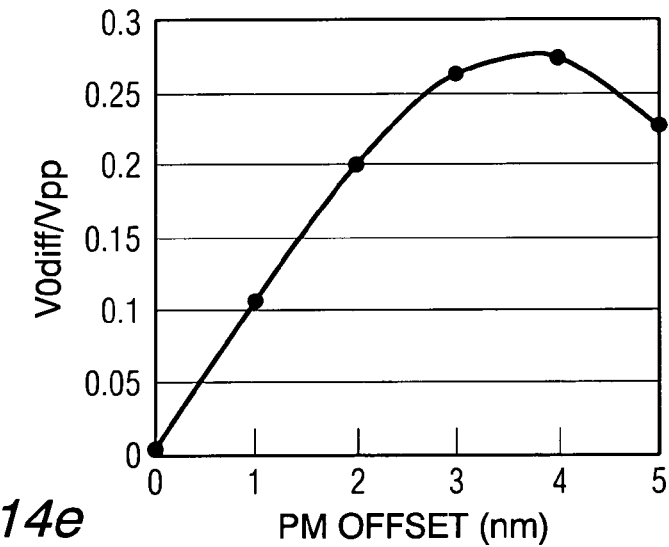
Figure 14F:
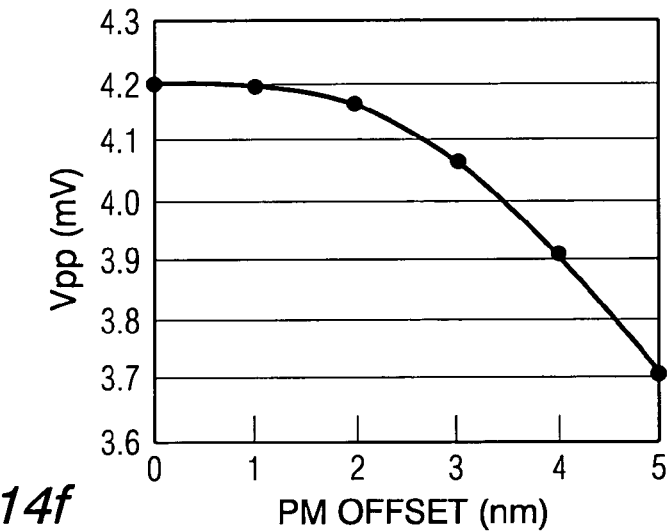

Next consider the effect of PM misalignment. That is, what will happen if the boundary of the PMs are not aligned with the center of the differential reader. FIGS. 14a through 14f illustrate the effect of PM offset for the case of thIns=14 nm. An offset of 0 means that the PM boundary and reader center coincide. The effect is symmetric; thus only positive offset results are shown. FIGS. 14a through 14c show the calculated on-track response for offsets of 0, 2, and 5 nm. FIGS. 14d through 14f show the calculated PW50, V0diff/Vpp, and Vpp vs. PM offset.

For the case of thins=14 nm in Table 3, the z-coordinate of the PM bottom (zPM) changes from −4 to 6 nm, corresponding to a misalignment (PM offset) of −5 nm to 5 nm. The effects are shown in FIGS. 14a through 14f. FIGS. 14a through 14c shows the calculated on-track responses at PM offsets of 0, 2 and 5 nm. Notice that the responses to an upward uniform field and to a downward uniform field are different (the curve is asymmetric about the peak) when the PM offset is nonzero because of the different biasing condition in the two CIP3L sensors. The difference in the response is denoted by V0diff and is plotted in the bottom center plot, after being normalized by Vpp, along with PW50 and Vpp. The plots of FIGS. 14a through 14c can be used as a reference for other designs. PW50 changes from about 32 nm at 0 offset to about 41 nm at an offset of 5 nm, which gives a PW50/bit length ratio of 2.3. The peak-to-peak voltage (Vpp) drops from 4.2 mV to 3.7 mV (about 12%). These are still acceptable for a 500 Gbpsi design.

Figure 15A:
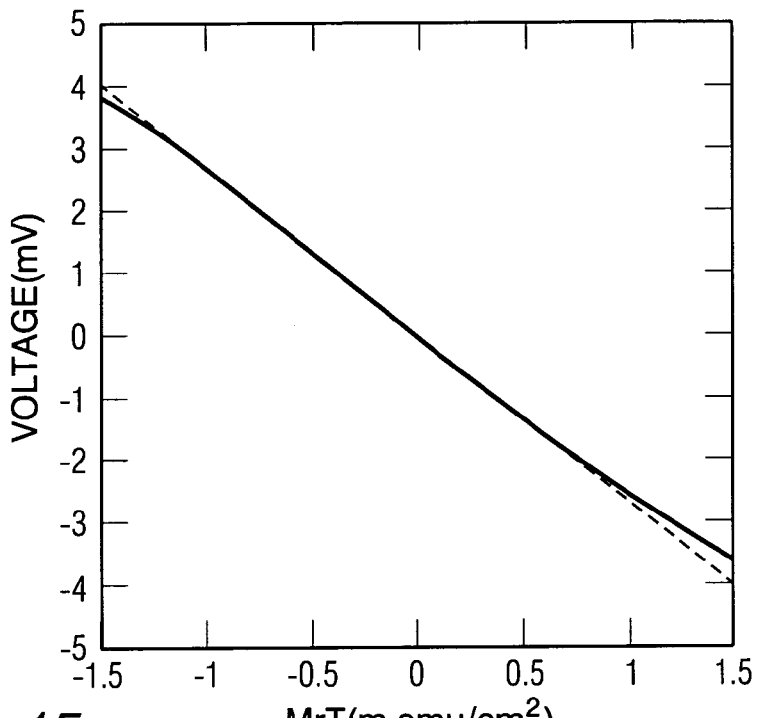
Figure 15B:
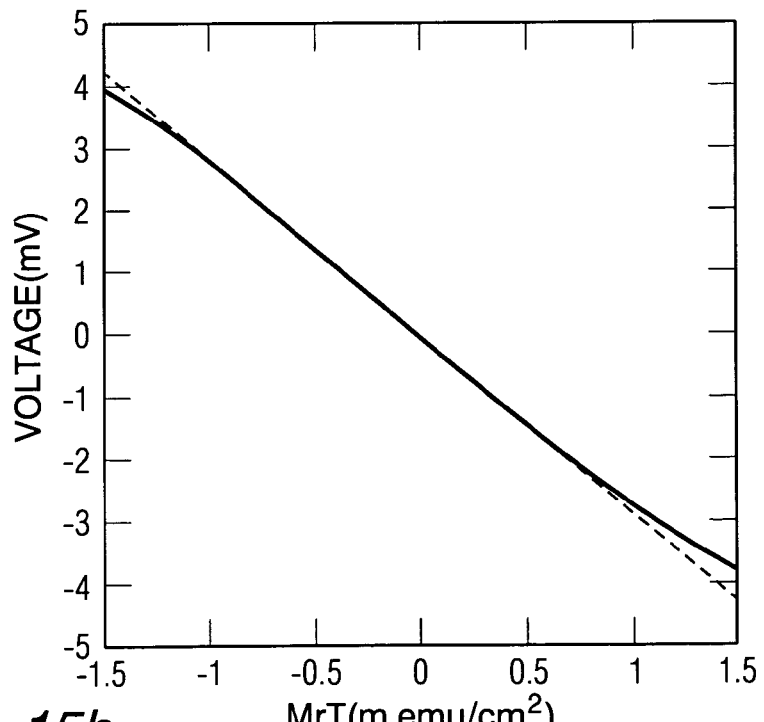
Figure 15C:
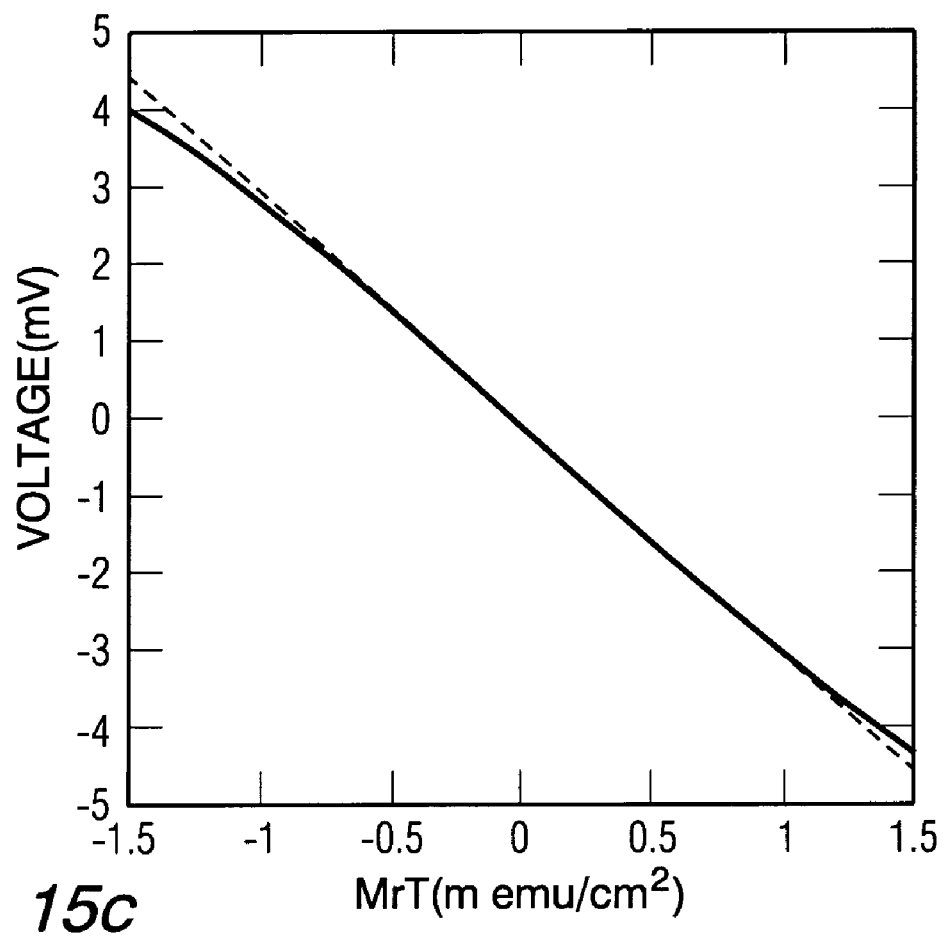

Next consider the effect of permanent magnet separation on tolerance to misalignment. That is, if the two permanent magnets are separated, will the separation help to reduce the effect of misalignment? A simulation was used to find the appropriate set of parameters for each PM separation so that good transfer curves can be obtained. The parameters chosen for the simulation are $S_{pm}$ (PM-to-PM separation), $S_{sensor}$ (sensor separation; called thIns above) and thPM (PM thickness). Note that here thPM and $S_{sensor}$ are independent of each other. This was done by allowing the z-coordinate of the PM bottom to change. Note also that Jex and MrPM have been kept fixed at Jex=−0.1 erg/cm² and Mr=1000 emu/cm³. Table 4 shows the transfer curve properties for the simulation. The transfer curves for three cases with different PM separations and having good transfer curve properties are shown in FIGS. 15a through 15c.

Figure 16A:
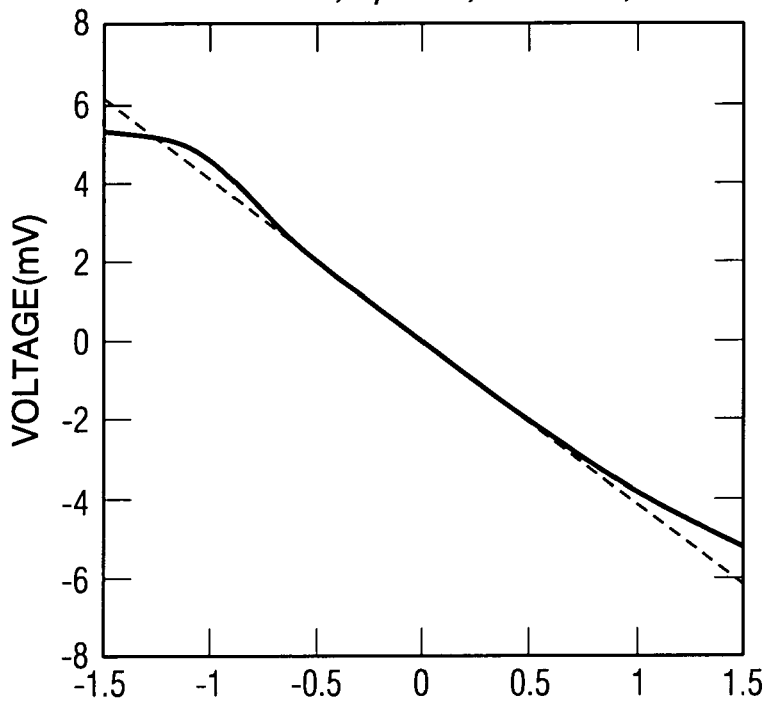
Figure 16B:
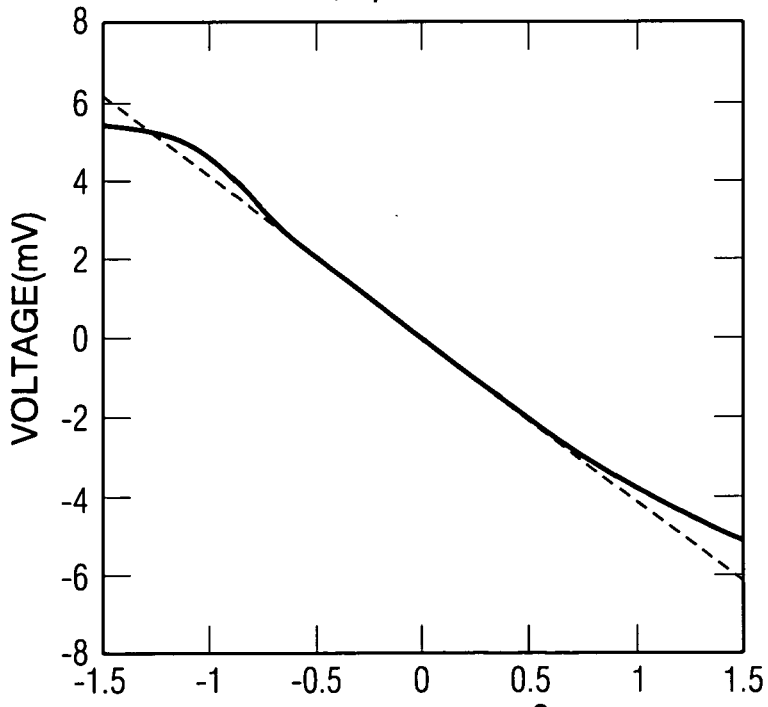
Figure 16C:
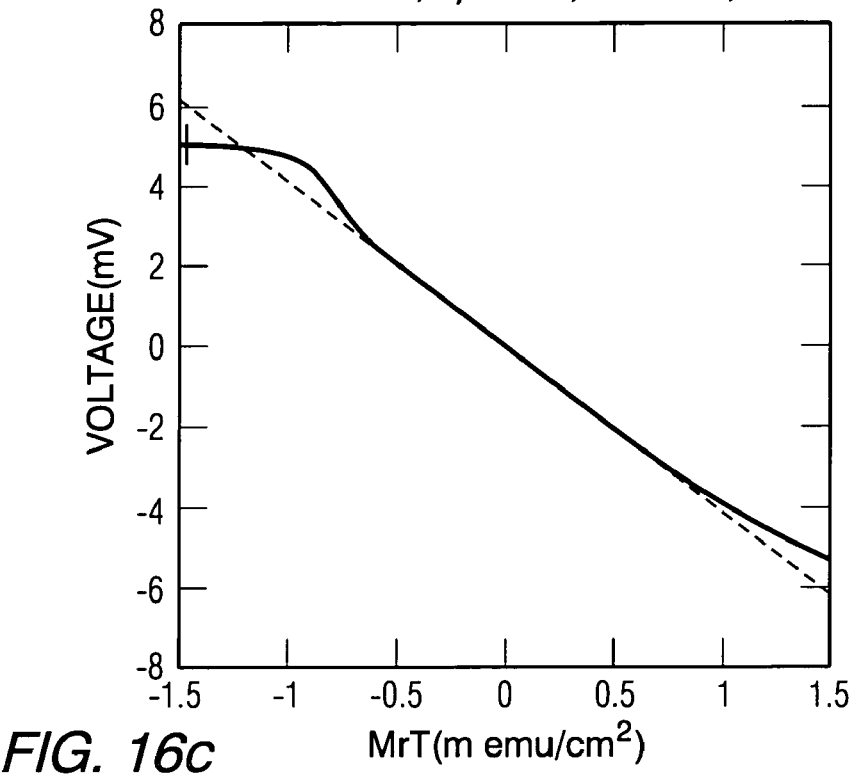
Figure 16D:
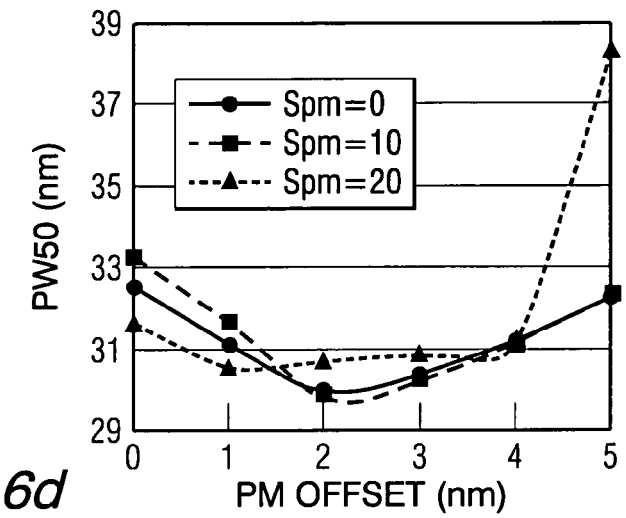
Figure 16E:
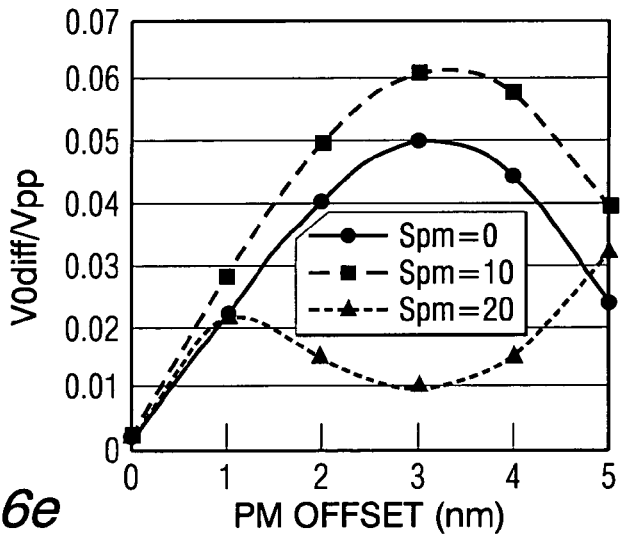
Figure 16F:
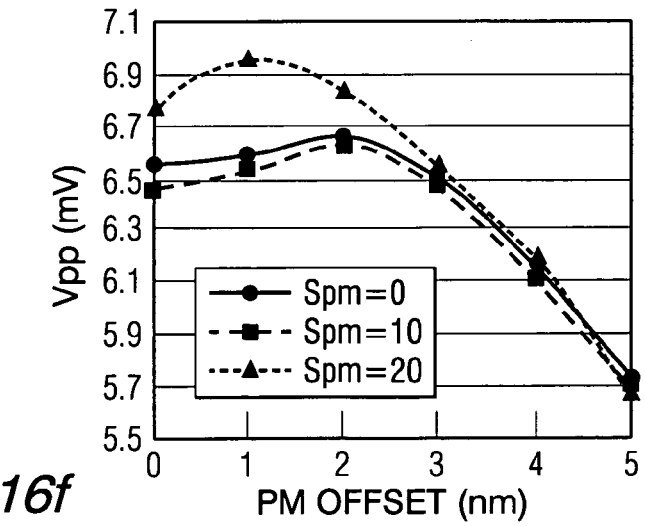

PMs as thick as 60 nm. Also, further increasing PM thickness does not seem to improve the results. Thus Jex was changed to −0.05 erg/cm². The transfer curves for three cases with different PM separations and proper biasing are shown in FIGS. 16a through 16c. The effect of PM offset was studied for the three cases, and PW50, V0diff/Vpp and Vpp are plotted against PM offset in FIGS. 16d through 16f.

TABLE 4

Transfer curve properties in the case of PMs on the sides of the sensor with a height of 40 nm.

| Run | Jex erg/cm² | MrPM emu/cm³ | thIns nm | gap nm | thPM nm | Vpp mV | MrT1 memu/cm² | MrT2 memu/cm² | V1 mV | V2 mV | Sensitivity mVcm²/memu | Asymmetry 1 | Hysteresis mVmemu/cm² | dMrT |
|---|---|---|---|---|---|---|---|---|---|---|---|---|---|---|
| 1 | −0.15 | 500 | 8 | 5 | 50 | 3.125 | 0.21 | 1.5 | −0.715 | −2.859 | −1.701 | −0.250 | 0.049 | 1.29 |
| 2 | −0.05 | 500 | 8 | 5 | 50 | 8.324 | −0.42 | 1.5 | 1.655 | −4.891 | −3.463 | 0.339 | 0.428 | 1.92 |
| 3 | −0.15 | 1000 | 8 | 5 | 50 | 4.297 | −1.5 | 1.5 | 2.082 | −2.215 | −1.457 | 0.940 | 0.000 | 3 |
| 4 | −0.05 | 1000 | 8 | 5 | 50 | 6.747 | −1.5 | 0.78 | 4.441 | −1.493 | −2.707 | 2.993 | 0.002 | 2.28 |
| 5 | −0.15 | 500 | 20 | 5 | 50 | 6.540 | −0.81 | 1.5 | 1.800 | −4.698 | −2.954 | 0.384 | 0.001 | 2.31 |
| 6 | −0.05 | 500 | 20 | 5 | 50 | 10.812 | −0.66 | 1.08 | 3.516 | −4.578 | −5.201 | 0.769 | 0.147 | 1.74 |
| 7 | −0.15 | 1000 | 20 | 5 | 50 | 8.326 | −1.5 | 1.38 | 4.490 | −3.664 | −3.243 | 1.223 | 0.001 | 2.88 |
| 8 | −0.05 | 1000 | 20 | 5 | 50 | 6.168 | −1.5 | 0.18 | 5.211 | −0.109 | −3.190 | 14.304 | 0.001 | 1.68 |
| 9 | −0.15 | 500 | 8 | 10 | 50 | 2.379 | 0.69 | 1.35 | −0.990 | −2.050 | −2.114 | −0.483 | 0.031 | 0.66 |
| 10 | −0.05 | 500 | 8 | 10 | 50 | 6.916 | 0.03 | 1.5 | −1.391 | −6.586 | −3.465 | −0.211 | 0.469 | 1.47 |
| 11 | −0.15 | 1000 | 8 | 10 | 50 | 4.788 | −0.66 | 1.5 | 1.065 | −2.773 | −1.643 | 0.384 | 0.032 | 2.16 |
| 12 | −0.05 | 1000 | 8 | 10 | 50 | 9.947 | −1.26 | 1.29 | 4.451 | −3.358 | −3.365 | 1.325 | 0.262 | 2.55 |
| 13 | −0.15 | 500 | 20 | 10 | 50 | 5.256 | 0.21 | 1.5 | −0.954 | −4.910 | −2.841 | −0.194 | 0.015 | 1.29 |
| 14 | −0.05 | 500 | 20 | 10 | 50 | 10.149 | −0.27 | 1.38 | 1.544 | −6.346 | −5.305 | 0.244 | 0.254 | 1.65 |
| 15 | −0.15 | 1000 | 20 | 10 | 50 | 9.088 | −1.5 | 1.5 | 6.204 | −2.884 | −3.253 | 0.839 | 0.003 | 3 |
| 16 | −0.05 | 1000 | 20 | 10 | 50 | 9.568 | −1.5 | 0.42 | 7.053 | −1.268 | −4.646 | 5.568 | 0.003 | 1.92 |
| 17 | −0.15 | 500 | 8 | 5 | 300 | 3.681 | −0.09 | 1.5 | 0.237 | −2.520 | −1.554 | 0.096 | 0.049 | 1.59 |
| 18 | −0.05 | 500 | 8 | 5 | 300 | 9.066 | −0.69 | 1.5 | 2.522 | −4.614 | −3.461 | 0.547 | 0.383 | 2.19 |
| 19 | −0.15 | 1000 | 8 | 5 | 300 | 5.967 | −1.5 | 1.5 | 4.776 | −1.191 | −2.090 | 0.875 | 0.000 | 3 |
| 20 | −0.05 | 1000 | 8 | 5 | 300 | 5.163 | −1.5 | 0.57 | 3.637 | −0.851 | −2.205 | 4.303 | 0.001 | 2.07 |
| 21 | −0.15 | 500 | 20 | 5 | 300 | 7.526 | −1.05 | 1.5 | 2.572 | −4.896 | −3.076 | 0.526 | 0.014 | 2.55 |
| 22 | −0.05 | 500 | 20 | 5 | 300 | 11.185 | −0.96 | 0.84 | 5.032 | −3.237 | −5.158 | 1.555 | 0.094 | 1.8 |
| 23 | −0.15 | 1000 | 20 | 5 | 300 | 7.288 | −1.5 | 0.9 | 4.636 | −2.057 | −3.055 | 2.247 | 0.001 | 2.4 |
| 24 | −0.05 | 1000 | 20 | 5 | 300 | 3.927 | −1.5 | 0.06 | 3.476 | −0.086 | −2.317 | 40.784 | 0.001 | 1.56 |
| 25 | −0.15 | 500 | 8 | 10 | 300 | 2.801 | 0.42 | 1.5 | −0.855 | −2.636 | −1.805 | −0.324 | 0.047 | 1.08 |
| 26 | −0.05 | 500 | 8 | 10 | 300 | 7.821 | −0.21 | 1.5 | 0.867 | −5.051 | −3.491 | 0.173 | 0.436 | 1.71 |
| 27 | −0.15 | 1000 | 8 | 10 | 300 | 4.453 | −1.5 | 1.5 | 0.121 | −4.332 | −1.393 | 1.047 | 0.001 | 3 |
| 28 | −0.05 | 1000 | 8 | 10 | 300 | 7.759 | −1.5 | 0.93 | 4.875 | −2.100 | −3.062 | 2.322 | 0.003 | 2.43 |
| 29 | −0.15 | 500 | 20 | 10 | 300 | 6.163 | −0.66 | 1.5 | 1.450 | −4.661 | −2.936 | 0.312 | 0.001 | 2.16 |
| 30 | −0.05 | 500 | 20 | 10 | 300 | 10.683 | −0.54 | 1.17 | 2.977 | −5.167 | −5.284 | 0.577 | 0.200 | 1.71 |
| 31 | −0.15 | 1000 | 20 | 10 | 300 | 8.671 | −1.5 | 1.5 | 4.375 | −4.297 | −3.316 | 1.017 | 0.001 | 3 |
| 32 | −0.05 | 1000 | 20 | 10 | 300 | 7.251 | −1.5 | 0.18 | 6.121 | −0.085 | −3.794 | 14.203 | 0.002 | 1.68 |

Figure 15D:
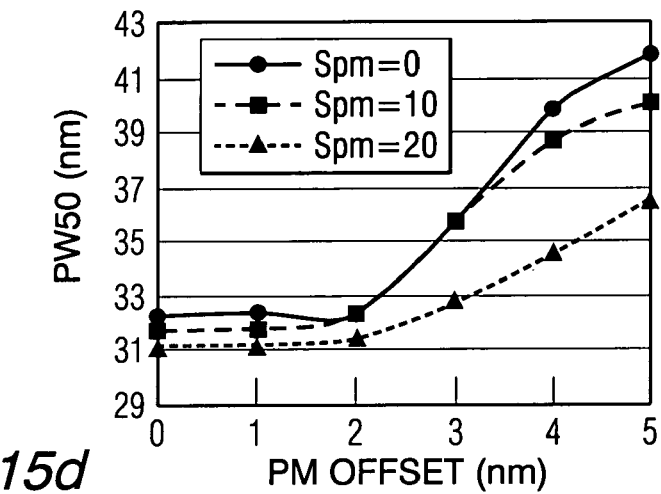
Figure 15E:
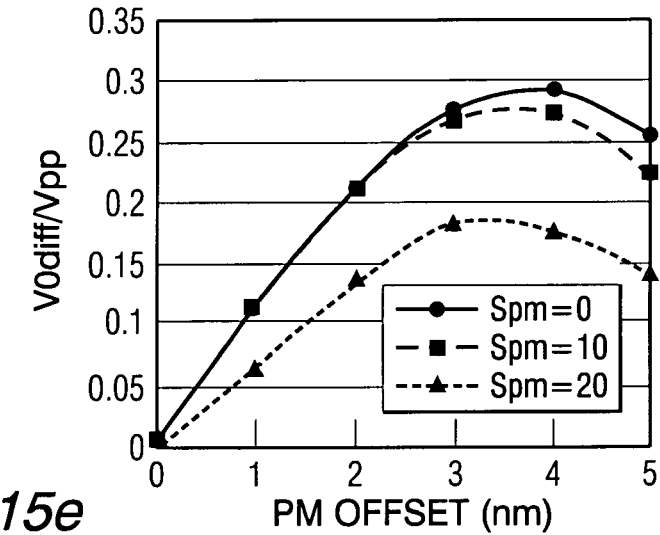
Figure 15F:
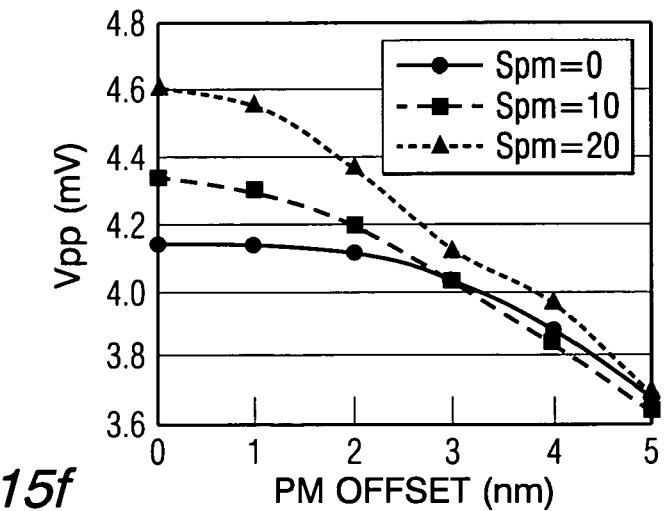

The downtrack responses of the three cases in FIG. 15a through 15c at different PM offsets (misalignments) were calculated and the PW50, V0diff/Vpp (see FIGS. 14a through 14f), and Vpp are plotted against PM offsets in FIGS. 15d through 15f. This shows that, among the three cases, the case of $S_{pm}$=20 nm (PM separation is 20 nm) has smallest PW50 and smallest V0diff/Vpp especially at large PM offsets. It also has the highest Vpp. Thus increasing PM separation from 0 to 20 nm appears to increase the tolerance to PM offset.

When PM offset increases even more, the performance of the sensor at all PM separations deteriorates. For all three PM separations studied, when PM offsets are 8 nm, the center bit cannot be resolved when reading back three bits with a bit length of 17.5 nm.

Next consider the effect of PM-Sensor separation on tolerance to misalignment. For the above analysis, the PM/sensor separation was 5 nm. To determine if increasing the separation will reduce the effect of PM/sensor misalignment, the separation was increased to 15 nm and several simulations were run to find a good biasing state. For MrPM=1000 emu/cm³ and Jex=−0.1 erg/cm², under-biasing occurs even for The data of FIGS. 16a through 16f show that PW50 almost always stays small (less than 34 nm) except for one data point (Spm=20 nm and PM offset=5 nm). Furthermore, V0diff/Vpp is much smaller than that shown in FIGS. 14e and 15e. Thus increasing PM/sensor separation appears to increase the tolerance of the reader to PM/sensor misalignment, at least in the case of smaller PM separations.

Figure 17:
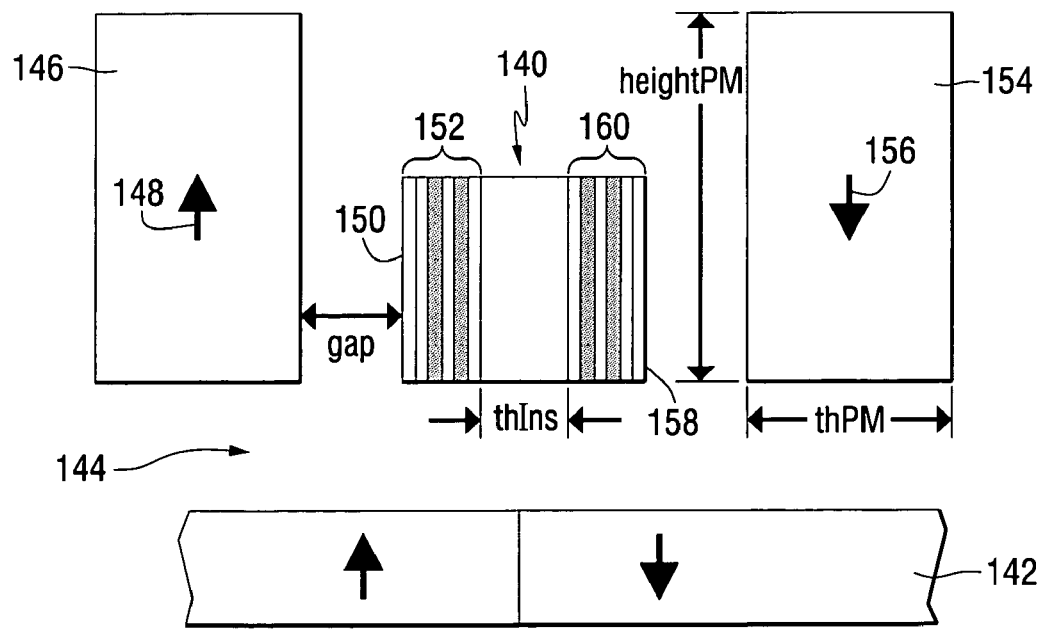
FIG. 17 is a schematic view of another sensor constructed in accordance with the invention.

FIG. 17 shows an alternative design of the sensor wherein the permanent magnets are positioned adjacent to the sides of sensor elements in a down track direction. This design eliminates the problem of PM misalignment. In FIG. 17, the sensor stack 140 is separated from the media 142 by an air bearing 144. A first bias magnet 146 having a magnetization 148 is positioned adjacent to a first side 150 of a first sensor element 152. A second bias magnet 154 having a magnetization 156 is positioned adjacent to a first side 158 of a second sensor element 160.

To get good transfer curves, the following design variables were considered: $J_{ex}$, MrPM, thIns, gap, thPM and heightPM (see FIG. 17). A series of six simulations were run as follows, where the number in parenthesis is the number of levels, and the number of levels is the number of values used for that parameter.

1. Parameters: thIns (3), thPM (3), heightPM (3), $J_{ex}$=−0.1 erg/cm², Mr=1000 emu/cm³.
2. Parameters: thIns (3), thPM (3), heightPM (3), modified thPM range.
3. Parameters: gap (2), thPM (3), heightPM (4).
4. Parameters: gap (2), thPM (4), Mr changed to 500 emu/cm³.
5. Same 4, but with $J_{ex}$ changed to −0.05 erg/cm².
6. Parameters: $J_{ex}$ (2), MrPM (2), thIns (2), gap (2), thPM (2).

The first two simulations (Nos. 1 and 2) show that the biasing field increases with decreasing PM height, as expected, and even for a PM height as low as 100 nm, a PM thickness of over 100 nm is required to get appropriate biasing in the case of $J_{ex}$=−0.1 erg/cm², Mr=1000 emu/cm³.

This causes a concern that the PMs will generate a high field in the media because of their large Mr and thickness, causing erasure problems. To see if the MrPM and thPM can be reduced while still maintaining proper biasing, the effect of reducing the gap (between the PMs and the sensor) from 10 nm to 5 nm and further reducing the height of PM to 40 nm was studied (simulation No. 3). Note that a PM height of 40 nm is exactly the same as the height of the sensor. The reasoning here is that the same lithography step could be used to determine the height of both the PMs and the sensor, thus eliminating the problem of alignment that would exist if PM height is small yet different from the sensor height.

The gap=5 nm and height PM=40 nm causes over-biasing in the case of $J_{ex}$=−0.1 erg/cm² and MrPM=1000 emu/cm³ (simulation No. 3). However, reducing MrPM to 500 emu/cm³ causes under-biasing (simulation No. 4), unless $J_{ex}$ is also changed to −0.05 erg/cm² (simulation No. 5).

Figure 18A:
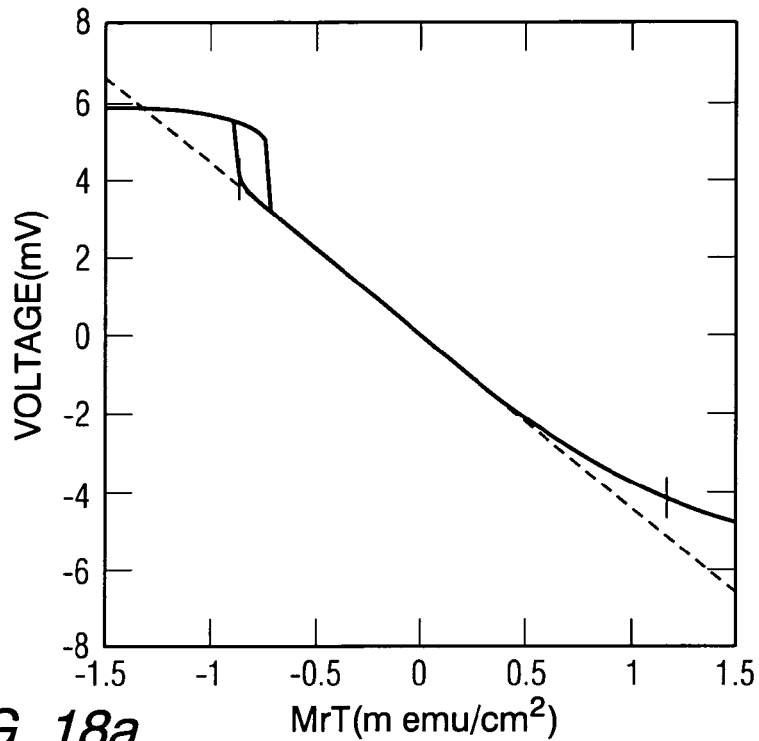
FIGS. 18 through 20 are graphs of data calculated based on the model of FIG. 17.
Figure 18B:
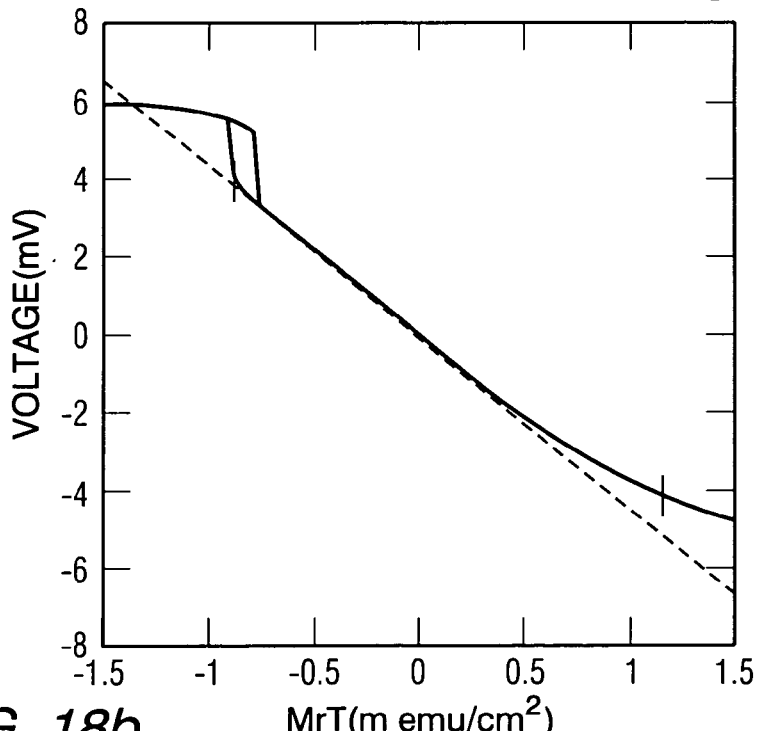

FIGS. 18a and 18b show two transfer curves for the case of $J_{ex}$=−0.05 erg/cm², Mr=500 emu/cm³ (from simulation No. 5). These curves show reasonably good symmetry and high sensitivity. However, the linear range is smaller than the previous designs, due to the lower |Jex|.

Figure 19A:
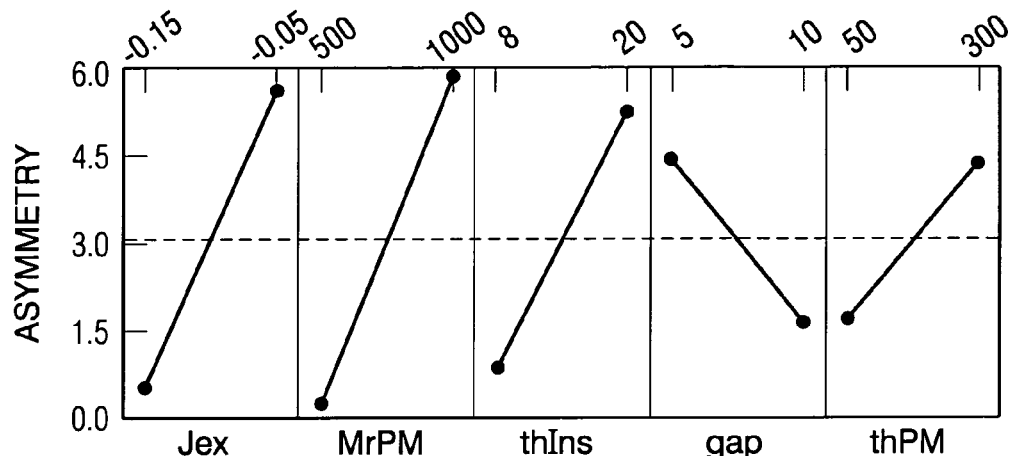
Figure 19B:
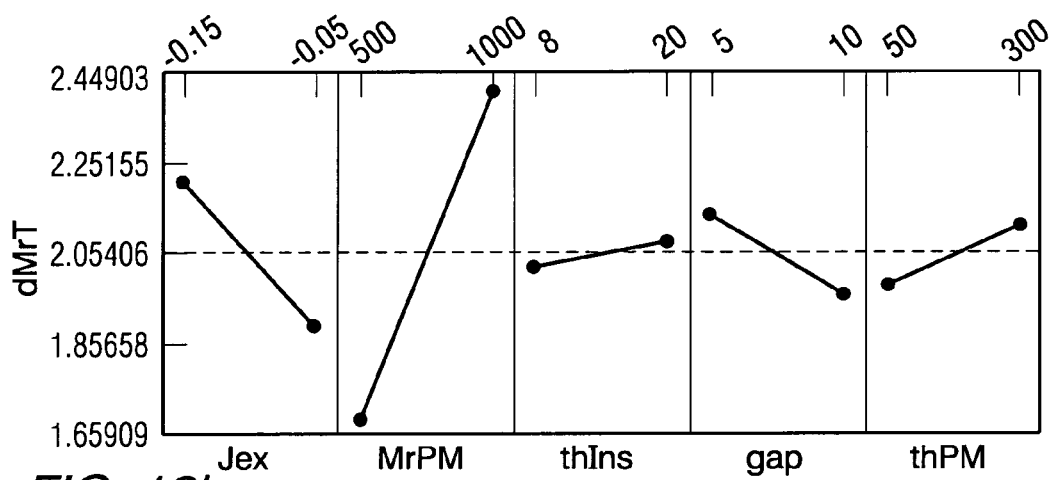
Figure 19C:
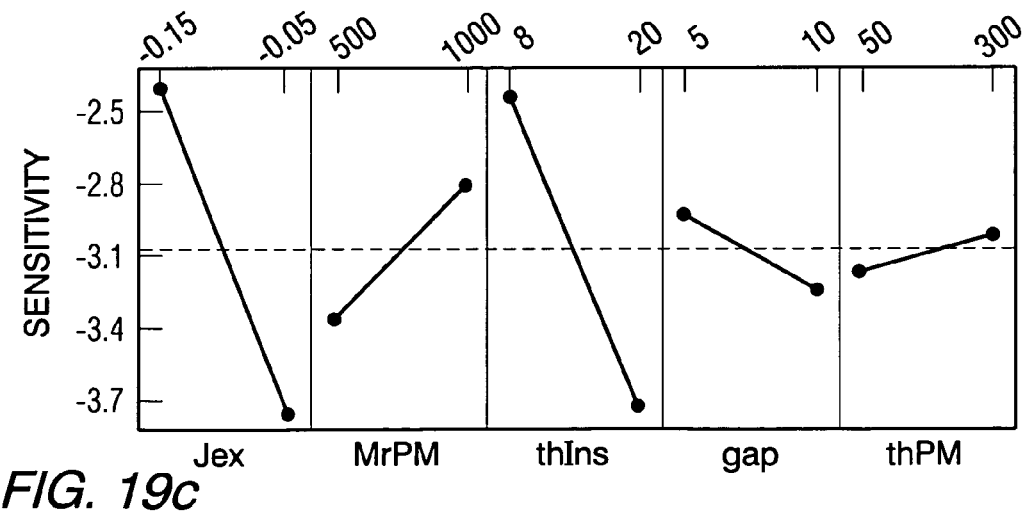

To more thoroughly investigate the effects of various parameters on asymmetry, linear range and sensitivity in the case of a PM height of 40 nm, a simulation with five parameters was run. The results are shown in Table 4 and FIGS. 19a through 19c. FIGS. 19a through 19c show the complex interaction between the various effects. For example, to reduce MrPM and thPM so that the PMs will not cause a high field in the media, one has to reduce |$J_{ex}$|, increase thIns, or reduce the gap to maintain symmetry. Reducing MrPM, thPM, and |$J_{ex}$| causes the linear range of dMrT to decrease and the sensitivity to increase, while increasing thIns and reducing the gap causes dMrT to increase.

With the help of a response optimizer, the parameter values that meet the design criteria can be predicted. Specifying 0.9<asymmetry<1.1, dMrT>2 memu/cm², |sensitivity|>2 mVcm²/memu and targeting 1, 2.5, and 3 for the above three properties respectively, a list of parameters was found that satisfy the criteria to varying degrees. This is shown in Table 5. Note that this is only a sample list. Also note that small MrPM and thPM values were specified whenever possible.

TABLE 5

List of parameters that satisfy the design criteria in varying extent. The D-value is the desirability.

| Setting | D-Value | $J_{ex}$ | MrPM | thIns | gap | thPM |
|---|---|---|---|---|---|---|
| Initial | 0.0 | −0.1000 | 500.0000 | 14.0000 | 5.0000 | 100.0000 |
| Optimal | 0.83301 | −0.1350 | 600.0000 | 20.0000 | 5.0000 | 50.0001 |

TABLE 5-continued

List of parameters that satisfy the design criteria in varying extent. The D-value is the desirability.

| Setting | D-Value | $J_{ex}$ | MrPM | thIns | gap | thPM |
|---|---|---|---|---|---|---|
| 1 | 0.0 | −0.1000 | 500.0000 | 14.0000 | 5.0000 | 100.0000 |
| 2 | 0.23766 | −0.1220 | 600.0000 | 14.0000 | 5.0000 | 100.0000 |
| 3 | 0.53452 | −0.1357 | 600.0000 | 18.5488 | 5.0000 | 100.0000 |
| 4 | 0.77162 | −0.1357 | 600.0000 | 20.0000 | 5.0000 | 50.0001 |
| 5 | 0.49621 | −0.1332 | 650.0000 | 14.0000 | 5.0000 | 100.0000 |

Figure 20:
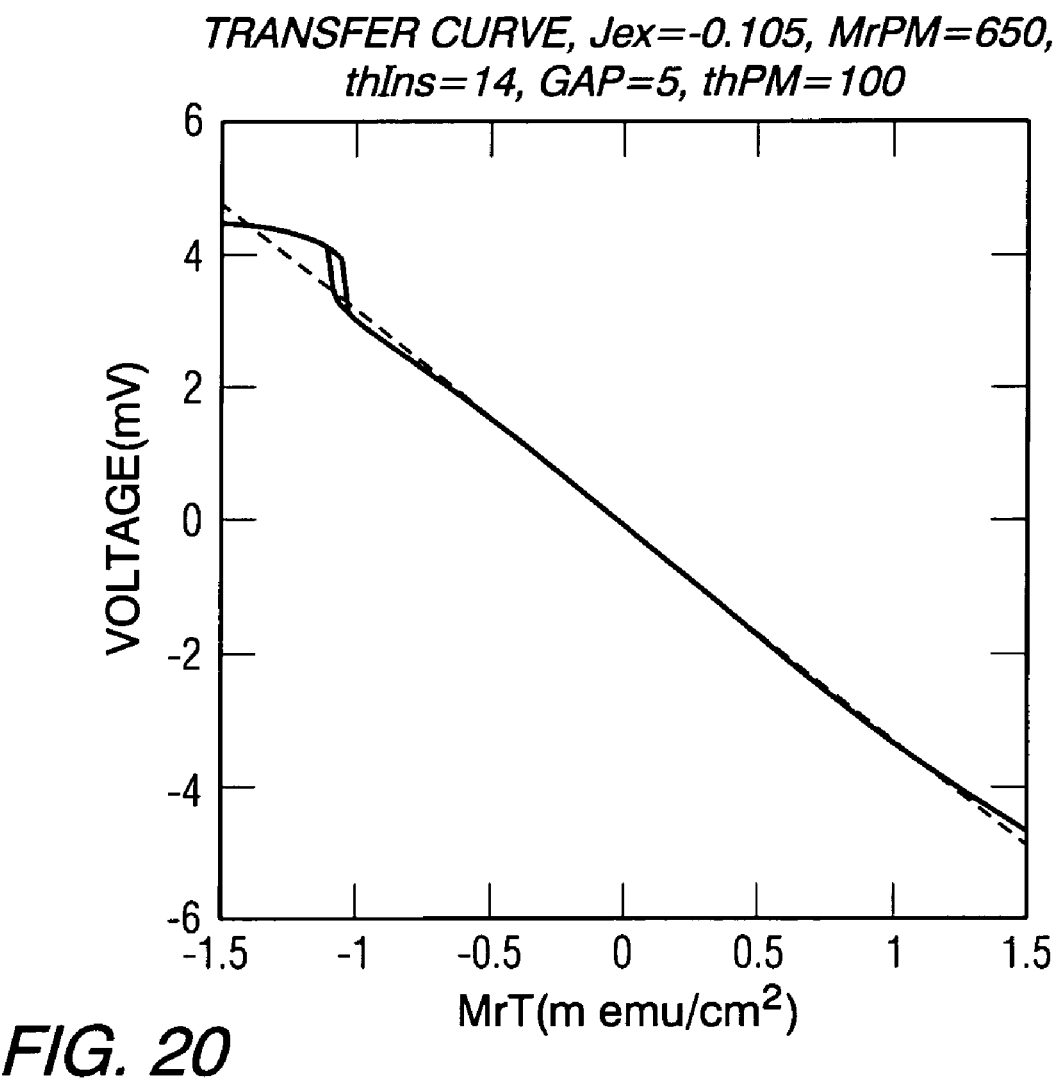

Taking one set of parameters (set 5) from Table 5, the accuracy of the prediction was verified. With all parameters but $J_{ex}$ fixed at the predicted value, it was found that the best asymmetry existed at $J_{ex}$=−0.105. This is a good result considering the large range used in the simulation. The transfer curve for this case is shown in FIG. 20.

The current-in-plane differential readers were modeled systematically with a micro-magnetic code. The main designs, with permanent magnets placed above the sensor, features highly linear transfer curves over a large range of media MrT (almost perfectly linear over a MrT range of 3 memu/cm²), small PW50 (as small as 30 nm), and reasonably large peak-to-peak voltage (as large as 5.7 mV for media Mr of 800 emu/cm³). The tolerance of these designs to permanent magnet/sensor misalignment was studied and methods of improving the tolerance were investigated. It was found that increasing the separation between the two permanent magnets and/or increasing the permanent magnet-to-sensor separation, could both increase the tolerance to the misalignment. An alternative design in which the permanent magnets are placed at the sides of the sensor in the down track direction was also modeled. This alternative design can be used if the above-mentioned misalignment is difficult to deal with in processing.

The sensor elements in the above examples include a trilayer stack comprising two ferromagnetic layers separated by a non-magnetic layer. However, other CIP sensors can be used, for example, spin-valves, anisotropic magnetoresistance (AMR) sensors, or sensors with more layers (multi-layer).

Figure 21:
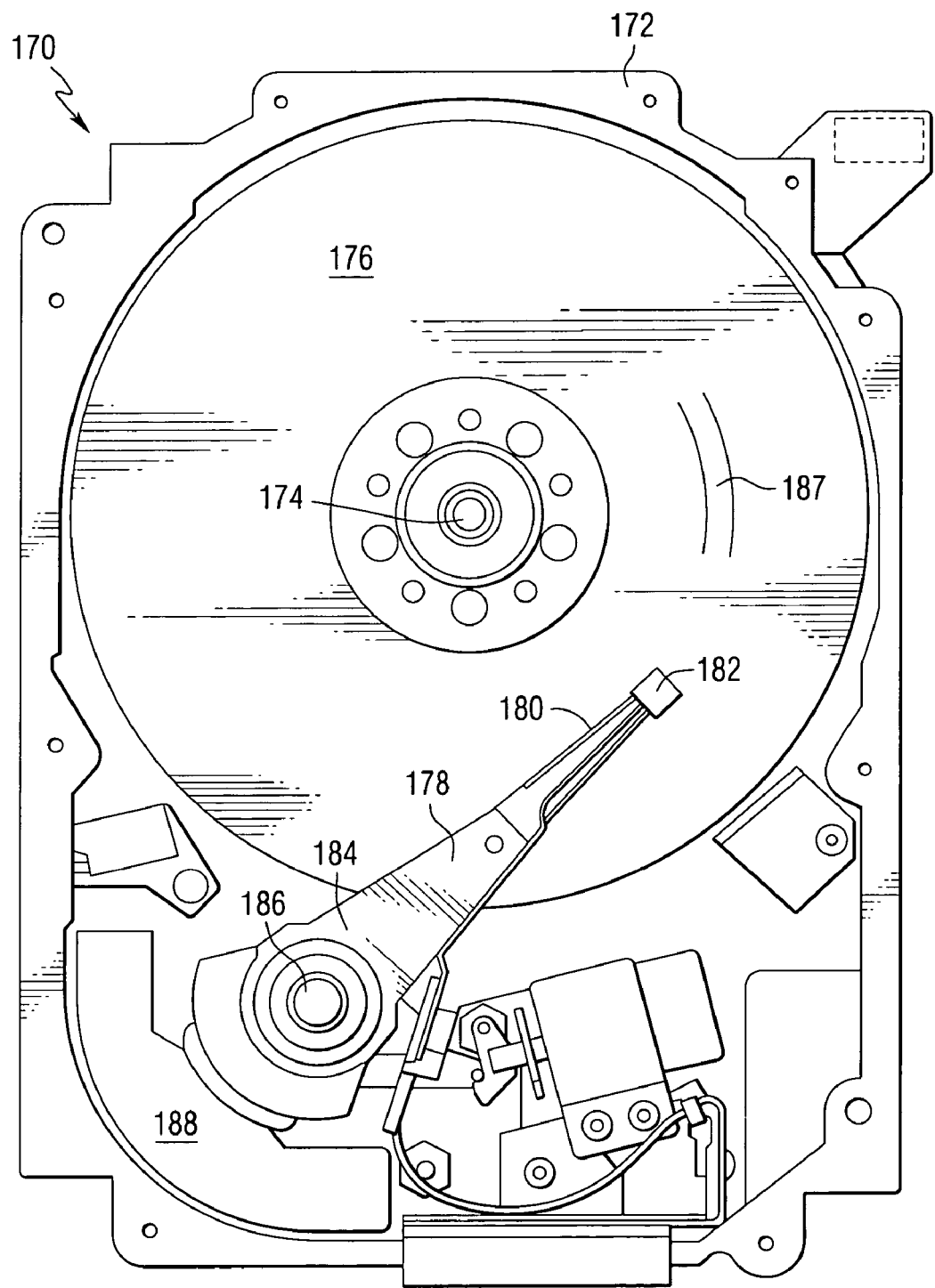
FIG. 21 is a pictorial representation of a disc drive that can include sensors constructed in accordance with the invention.

FIG. 21 is a pictorial representation of a disc drive 170 that can utilize a sensor in accordance with this invention. The disc drive 170 includes a housing 172 (with the upper portion removed and the lower portion visible in this view) sized and configured to contain the various components of the disc drive. The disc drive 170 includes a spindle motor 174 for rotating at least one storage medium 176, which may be a ferroelectric recording medium, within the housing 172. At least one arm 178 is contained within the housing 172, with each arm 178 having a first end 180 with a recording head or slider 182, and a second end 184 pivotally mounted on a shaft by a bearing 186. An actuator motor 188 is located at the arm's second end 184 for pivoting the arm 178 to position the recording head 182 over a desired sector or track 187 of the disc 176. The actuator motor 188 is regulated by a controller, which is not shown in this view and is well-known in the art.

Figure 22:
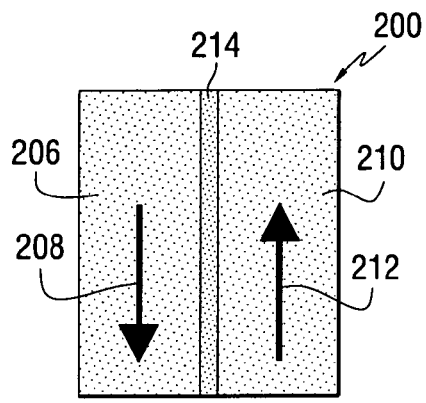
FIGS. 22-27 illustrate alternative biasing configurations.

While FIG. 1 shows the use of permanent magnets that serve as magnetic field sources to bias the sensing elements, the biasing could be achieved by various alternative structures. FIG. 22 illustrates a sensor 200 including two CIP sensing elements 202 and 204. A permanent magnet 206 having a magnetization 208 is positioned adjacent to sensing element 202 to bias sensor element 202. A soft magnetic material 210 is positioned adjacent to the permanent magnet.

RKKY coupling is used to antiferromagnetically couple the soft magnetic material to the permanent magnet such that the soft magnetic material has a magnetization 212, and biases sensor element 204. A layer of non-magnetic material 214 is positioned between the permanent magnet and the soft magnetic material.

Figure 23:
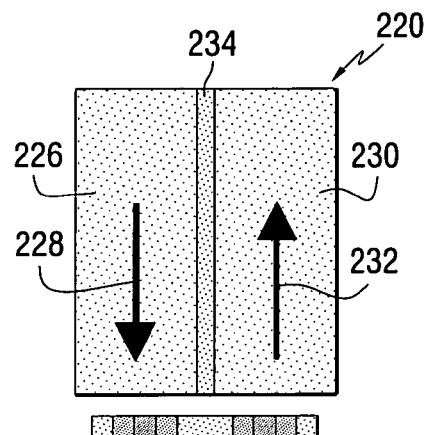

FIG. 23 illustrates a sensor 220 including two CIP sensing elements 222 and 224. A first permanent magnet 226, having a magnetization 228, is positioned adjacent to sensing element 222 to bias sensor element 222. A second permanent magnet 230, having a magnetization 232, is positioned adjacent to the second sensing element 224 to bias the second sensing element. The second permanent magnet has a higher coercivity than the first permanent magnet. The permanent magnets are decoupled with a very thin non-magnetic layer 234. While keeping the coercivities of the magnetic layers above about 2000 Oe, a larger difference in coercivity between the layers is preferred. For example the difference in coercivity can be about 1000 Oe.

Figure 24:
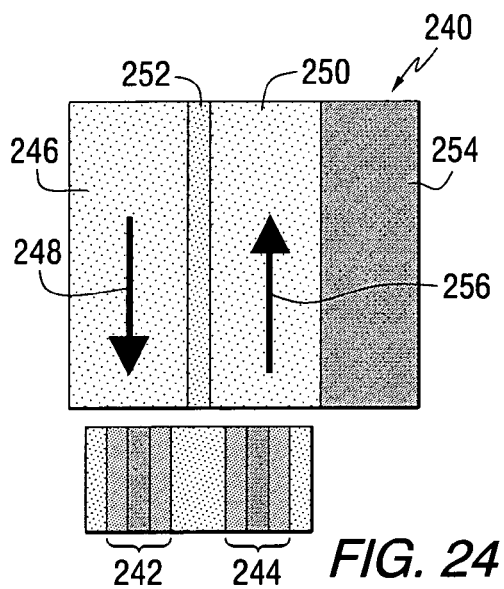

FIG. 24 illustrates a sensor 240 including two CIP sensing elements 242 and 244. A first permanent magnet 246 having a magnetization 248 is positioned adjacent to sensing element 242 to bias sensor element 242. A soft magnetic material 250 is positioned adjacent to the second sensing element 244 to bias the second sensing element. The permanent magnet and the soft magnetic material are separated by a very thin non-magnetic layer 252. The soft magnetic material coupled to an antiferromagnetic layer 254, and has a magnetization 256. FIG. 24 illustrates decoupling of the biasing magnets with a very thin non-magnetic layer and using a permanent magnet for one biasing magnet and a pinned, soft magnetic material for the other biasing magnet.

Figure 25:
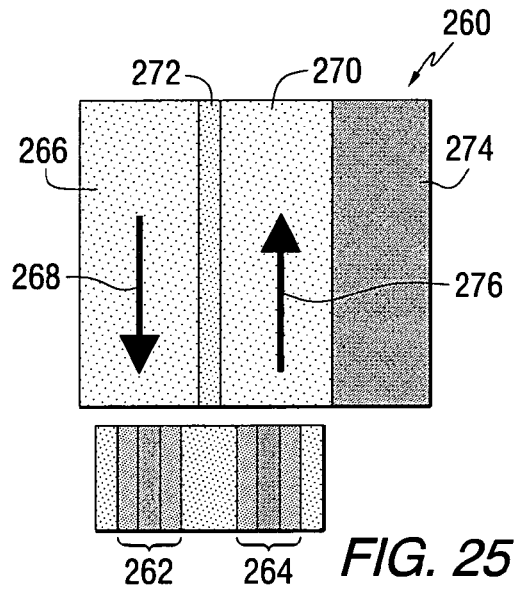

FIG. 25 illustrates a sensor 260 including two CIP sensing elements 262 and 264. A first soft magnetic material 266 having a magnetization 268 is positioned adjacent to sensing element 262 to bias sensor element 262. A second soft magnetic material 270 is positioned adjacent to the second sensing element 264 to bias the second sensing element. The first and second soft magnetic materials are separated by a very thin non-magnetic layer 272. The second soft magnetic material is coupled to an antiferromagnetic layer 274, and has a magnetization 276. FIG. 25 illustrates forming the biasing layers out of soft magnetic materials, using RKKY coupling to align them antiferromagnetically and pinning one of the layers.

Figure 26:
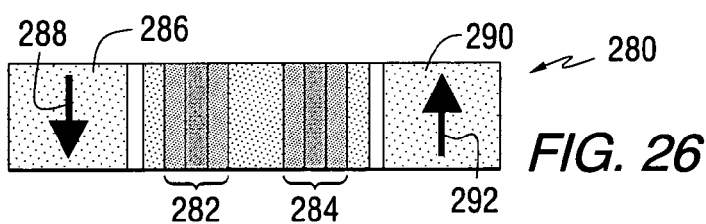

FIG. 26 illustrates a sensor 280 including two CIP sensing elements 282 and 284. A first permanent magnet 286 having a magnetization 288 is positioned adjacent a side of sensing element 282 to bias sensor element 282. A second permanent magnet 290 having a magnetization 292 is positioned adjacent a side of sensing element 284 to bias sensor element 284.

Figure 27:
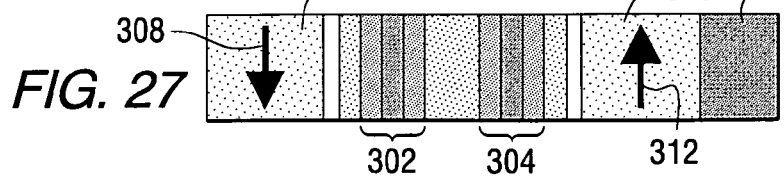

FIG. 27 illustrates a sensor 300 including two CIP sensing elements 302 and 304. A first permanent magnet 306 having a magnetization 308 is positioned adjacent a side of sensing element 302 to bias sensor element 302. A soft magnetic material 310 having a magnetization 312 is positioned adjacent a side of sensing element 304 to bias sensor element 304. The soft magnetic material is coupled to an antiferromagnetic layer 314.

FIGS. 26 and 27 illustrate placing permanent magnets or pinned soft magnetic material on the outer edges of the CIP3L sensors. The height of the permanent magnets could be larger, smaller or similar to the sensor height when the PMs are at the ends of the sensor stack.

While the invention has been described in terms of several examples, it will be apparent to those skilled in the art that various changes can be made to the described examples without departing from the scope of the invention as defined by the following claims.

What is claimed is:

1. An apparatus comprising:
    a first current-in-plane sensor including first and second layers of ferromagnetic material, and a first layer of non-magnetic material positioned between the first and second layers of ferromagnetic material, wherein the thickness of the first layer of non-magnetic material is selected to provide antiferromagnetic coupling between the first and second ferromagnetic layers;
    a first magnetic field source for biasing the first and second layers of ferromagnetic material in the first current-in-plane sensor in a first direction;
    a second current-in-plane sensor positioned parallel to the first current-in-plane sensor including third and fourth layers of ferromagnetic material, and a second layer of non-magnetic material positioned between the third and fourth layers of ferromagnetic material, wherein the thickness of the second layer of non-magnetic material is selected to provide antiferromagnetic coupling between the first and second ferromagnetic layers;
    a second magnetic field source for biasing the third and fourth layers of ferromagnetic material in the second current-in-plane sensor in a second direction; and
    first and second electrodes for supplying sense current to the first and second current-in-plane sensors.

2. The apparatus of claim 1, wherein the first magnetic field source biases the directions of magnetization of the first and second layers of ferromagnetic material of the first current-in-plane sensor in directions approximately 90° with respect to each other, and the second magnetic field source biases the directions of magnetization of the third and fourth layers of ferromagnetic material of the second current-in-plane sensor in directions approximately 90° with respect to each other.

3. The apparatus of claim 1, wherein each of the first and second current-in-plane sensors further comprises:
    a first nano-oxide layer positioned adjacent to the first layer of ferromagnetic material.

4. The magnetic sensor of claim 3, further comprising:
    a cap layer positioned adjacent to the first nano-oxide layer, wherein the first nano-oxide layer is positioned adjacent to a second side of the sensor stack opposite the substrate.

5. The magnetic sensor of claim 3, further comprising:
    a second nano-oxide layer positioned adjacent to the second layer of ferromagnetic material.

6. The magnetic sensor of claim 1, wherein the first magnetic field source comprises a permanent magnet and the second magnetic field source comprises a soft magnetic material antiferromagnetically coupled to the permanent magnet by RKKY coupling.

7. The magnetic sensor of claim 1, wherein the first and second magnetic field sources each comprise a permanent magnet and a non-magnetic layer is positioned between the permanent magnets.

8. The magnetic sensor of claim 7, wherein one of the permanent magnets has a larger coercivity than the other permanent magnet.

9. The magnetic sensor of claim 1, wherein the first magnetic field source comprises a permanent magnet and the second magnetic field source comprises a pinned soft magnetic material.

10. The magnetic sensor of claim 1, wherein the first and second magnetic field sources comprise biasing layers of soft magnetic materials, wherein the biasing layers are RKKY coupled and aligned antiferromagnetically.

11. The magnetic sensor of claim 1, wherein the first and second magnetic field sources comprise permanent magnets on the outer edges of the sensors.

12. The magnetic sensor of claim 1, wherein the first and second magnetic field sources comprise pinned soft magnetic material on the outer edges of the sensors.

13. The magnetic sensor of claim 1, wherein each of the magnetic field sources comprises:
   a permanent magnet positioned adjacent to a side of the sensor stack.

14. The magnetic sensor of claim 13, wherein the side is opposite an air bearing side of the sensor stack.

15. The magnetic sensor of claim 1, further comprising:
   a spacer layer positioned between the first and second current-in-plane sensors.

16. The magnetic sensor of claim 1, wherein the first and second directions are antiparallel.

17. The magnetic sensor of claim 1, wherein each of the first and second current-in-plane sensors comprises:
   first and second layers of ferromagnetic material including a material selected from the group of CoFe, NiFe, Fe, Co and Ni, and alloys thereof, and a layer of non-magnetic material including a material selected from Cu, Ag, Au, Cr and alloys thereof, wherein the layer of non-magnetic material is positioned between the first and second layers of ferromagnetic material.

18. The magnetic sensor of claim 17, wherein the thickness of the non-magnetic layer is in the range of 5 to 13 Å.

19. The magnetic sensor of claim 17, wherein the thickness of each of the first and second layers of ferromagnetic material is in the range of 10 to 20 Å.

* * * * *

UNITED STATES PATENT AND TRADEMARK OFFICE
CERTIFICATE OF CORRECTION

PATENT NO. : 7,573,684 B2  Page 1 of 1
APPLICATION NO. : 11/105128
DATED : August 11, 2009
INVENTOR(S) : Seigler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 627 days.

Signed and Sealed this

Fourteenth Day of December, 2010

David J. Kappos
*Director of the United States Patent and Trademark Office*